REMOTE-CONTROL MANIPULATOR

Filed June 17, 1955 18 Sheets-Sheet 1

INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY INVENTORS
RAYMOND C. GOERTZ,
ROLAND G. SCHMITT, JR.,
ROBERT A. OLSEN,
ROBERT B. WEHRLE
BY Roland A. Anderson
ATTORNEY INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY Dec. 18, 1956 R. C. GOERTZ ET AL 2,774,488

REMOTE-CONTROL MANIPULATOR

Filed June 17, 1955 18 Sheets-Sheet 4

INVENTORS
RAYMOND C. GOERTZ,
ROLAND G. SCHMITT, JR.,
ROBERT A. OLSEN,
ROBERT B. WEHRLE,

BY Roland A. Anderson
ATTORNEY.

REMOTE-CONTROL MANIPULATOR

Filed June 17, 1955 18 Sheets-Sheet 5

INVENTORS.
RAYMOND C. GOERTZ,
ROLAND G. SCHMITT, JR.,
ROBERT A. OLSEN,
ROBERT B. WEHRLE.

BY Roland A. Anderson
ATTORNEY

Dec. 18, 1956 R. C. GOERTZ ET AL 2,774,488

REMOTE-CONTROL MANIPULATOR

Filed June 17, 1955 18 Sheets-Sheet 6

INVENTORS.
RAYMOND C. GOERTZ,
ROLAND G. SCHMITT, JR.,
ROBERT A. OLSEN,
ROBERT B. WEHRLE.

BY Roland A. Anderson
ATTORNEY

Dec. 18, 1956 R. C. GOERTZ ET AL 2,774,488

REMOTE-CONTROL MANIPULATOR

Filed June 17, 1955 18 Sheets-Sheet 7

INVENTORS.
RAYMOND C. GOERTZ,
ROLAND G. SCHMITT, JR.,
ROBERT A. OLSEN,
ROBERT B. WEHRLE.

BY Roland A. Anderson
ATTORNEY

INVENTORS.
RAYMOND C. GOERTZ,
ROLAND G. SCHMITT, JR.,
ROBERT A. OLSEN,
ROBERT B. WEHRLE
BY Roland A. Anderson
ATTORNEY INVENTORS.
RAYMOND C. GOERTZ,
ROLAND G. SCHMITT, JR.,
ROBERT A. OLSEN,
ROBERT B. WEHRLE
BY Roland A. Anderson
ATTORNEY

REMOTE-CONTROL MANIPULATOR

Filed June 17, 1955 18 Sheets-Sheet 10

INVENTORS
RAYMOND C. GOERTZ,
ROLAND G. SCHMITT, JR.,
ROBERT A. OLSEN,
ROBERT B. WEHRLE
BY Roland A. Anderson
ATTORNEY Dec. 18, 1956 R. C. GOERTZ ET AL 2,774,488

REMOTE-CONTROL MANIPULATOR

Filed June 17, 1955 18 Sheets-Sheet 11

INVENTORS.
RAYMOND C. GOERTZ,
ROLAND G. SCHMITT, JR.,
ROBERT A. OLSEN,
ROBERT B. WEHRLE

BY Roland A. Anderson
ATTORNEY

INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY Dec. 18, 1956 R. C. GOERTZ ET AL 2,774,488

REMOTE-CONTROL MANIPULATOR

Filed June 17, 1955 18 Sheets-Sheet 13

INVENTORS
RAYMOND C. GOERTZ,
ROLAND G. SCHMITT, JR.,
ROBERT A. OLSEN,
ROBERT B WEHRLE.

BY Roland A. Anderson
ATTORNEY

INVENTORS
RAYMOND C. GOERTZ,
ROLAND G. SCHMITT, JR.,
ROBERT A. OLSEN,
ROBERT B. WEHRLE
BY Roland A. Anderson
ATTORNEY

REMOTE-CONTROL MANIPULATOR

Filed June 17, 1955 18 Sheets-Sheet 15

INVENTORS.
RAYMOND C. GOERTZ,
ROLAND G. SCHMITT, JR.,
ROBERT A. OLSEN,
ROBERT B. WEHRLE
BY Roland A. Anderson
ATTORNEY INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY Dec. 18, 1956 R. C. GOERTZ ET AL 2,774,488

REMOTE-CONTROL MANIPULATOR

Filed June 17, 1955 18 Sheets-Sheet 17

INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY INVENTORS
RAYMOND C. GOERTZ,
ROLAND G. SCHMITT, JR.,
ROBERT A. OLSEN,
ROBERT B. WEHRLE.
BY Roland A. Anderson
ATTORNEY United States Patent Office 2,774,488

Patented Dec. 18, 1956

2,774,488

REMOTE-CONTROL MANIPULATOR

Raymond C. Goertz, Downers Grove, Ill., Roland G. Schmitt, Jr., Fort Worth, Tex., and Robert A. Olsen, Chicago, and Robert B. Wehrle, Lemont, Ill., assignors to the United States of America as represented by the United States Atomic Energy Commission

Application June 17, 1955, Serial No. 516,340

11 Claims. (Cl. 214—1)

This invention relates to a remote-control manipulator of the type by which movements of a handle engaged by an operator are reproduced in a claw or grasper engaging an article to be manipulated.

According to the present invention, it is proposed to house in a protective boot the end of a slave arm of the manipulator to which the grasper is attached, while positioning the grasper outside the boot. A special arrangement of boot, grasper, and slave arm is provided which enables the slave arm, inside the boot, to manipulate the grasper, outside the boot. We have also rearranged the manipulator so that there is no counterweight on the slave arm and the latter can more easily receive the protective boot. Moreover, it is relatively easy to transport and shift the manipulator about in a limited space, in spite of the fact that the manipulator arms are interconnected by a horizontal support and an upper link, which are widely spaced from one another.

Figure 1:
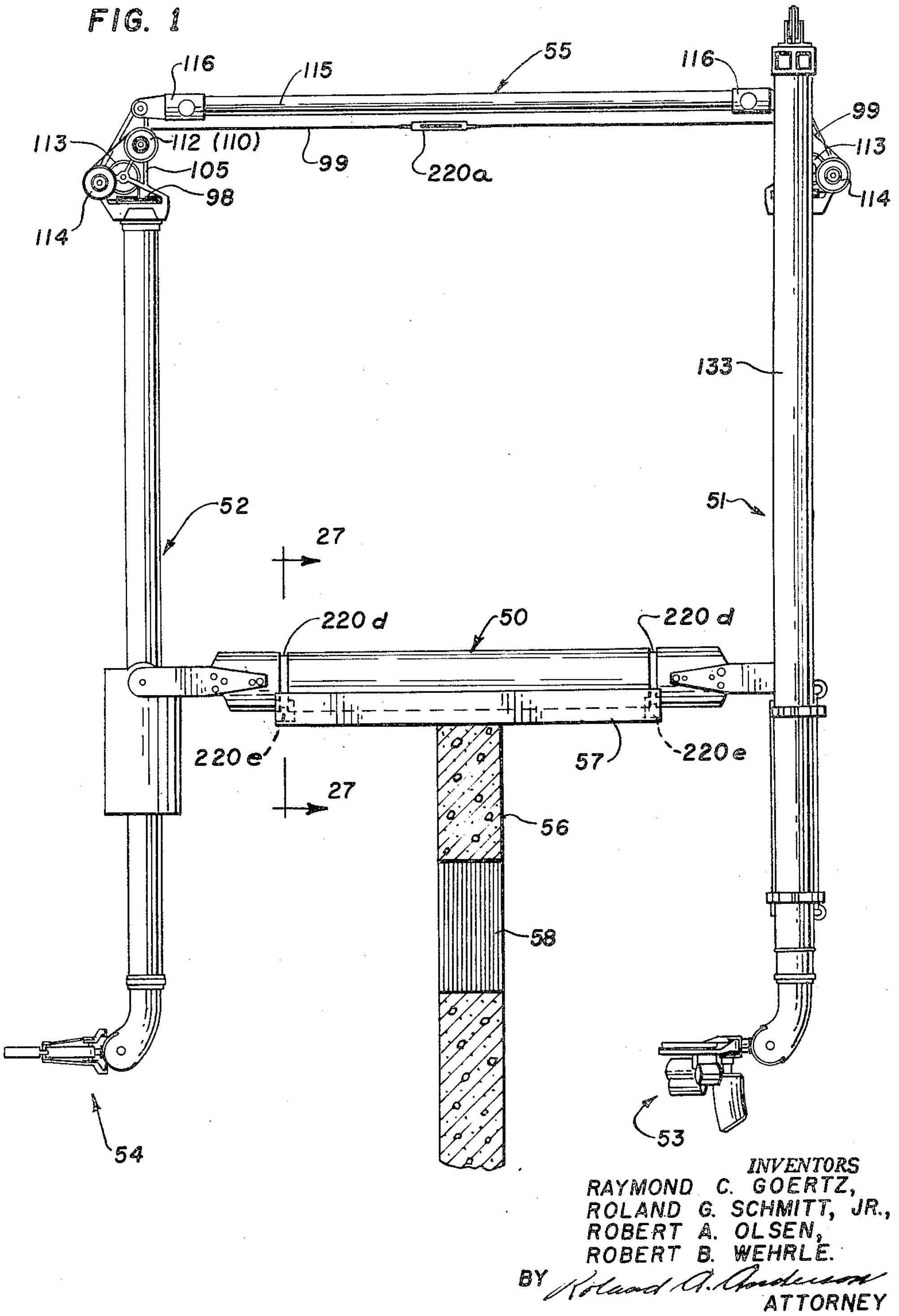
Fig. 1 is an elevational view of the remote-control manipulator of the present invention.

As shown in Fig. 1, the remote-control manipulator of the present invention includes a horizontal support 50, master and slave arms 51 and 52 at the ends of the support, a handle 53 at the lower end of the master arm 51, a grasper 54 at the lower end of the slave arm 52, and a link 55 which interconnects the upper ends of the master and slave arms 51 and 52 so as to move up and down toward and away from the support 50 when the arms are moved vertically with respect to the support 50. The manipulator may also include a protective boot **55*a* (Fig. 32) which fits between the lower end of the slave arm 52 and the gripper 54, which is detachable. The manipulator is adapted to be positioned with respect to a protective wall 56 so that the handle 53 is in a safe area to one side of the wall 56 and the grasper is in a dangerous area to the other side of the wall. The manipulator is shown to be mounted with the horizontal support 50 positioned in a channel member 57 so as to be angularly shiftable about its own axis. The wall 56 is provided with a window 58** which is as thick as or a little thicker than the wall and may be formed of a plurality of glass plates.

Figures 2, 3, 4:
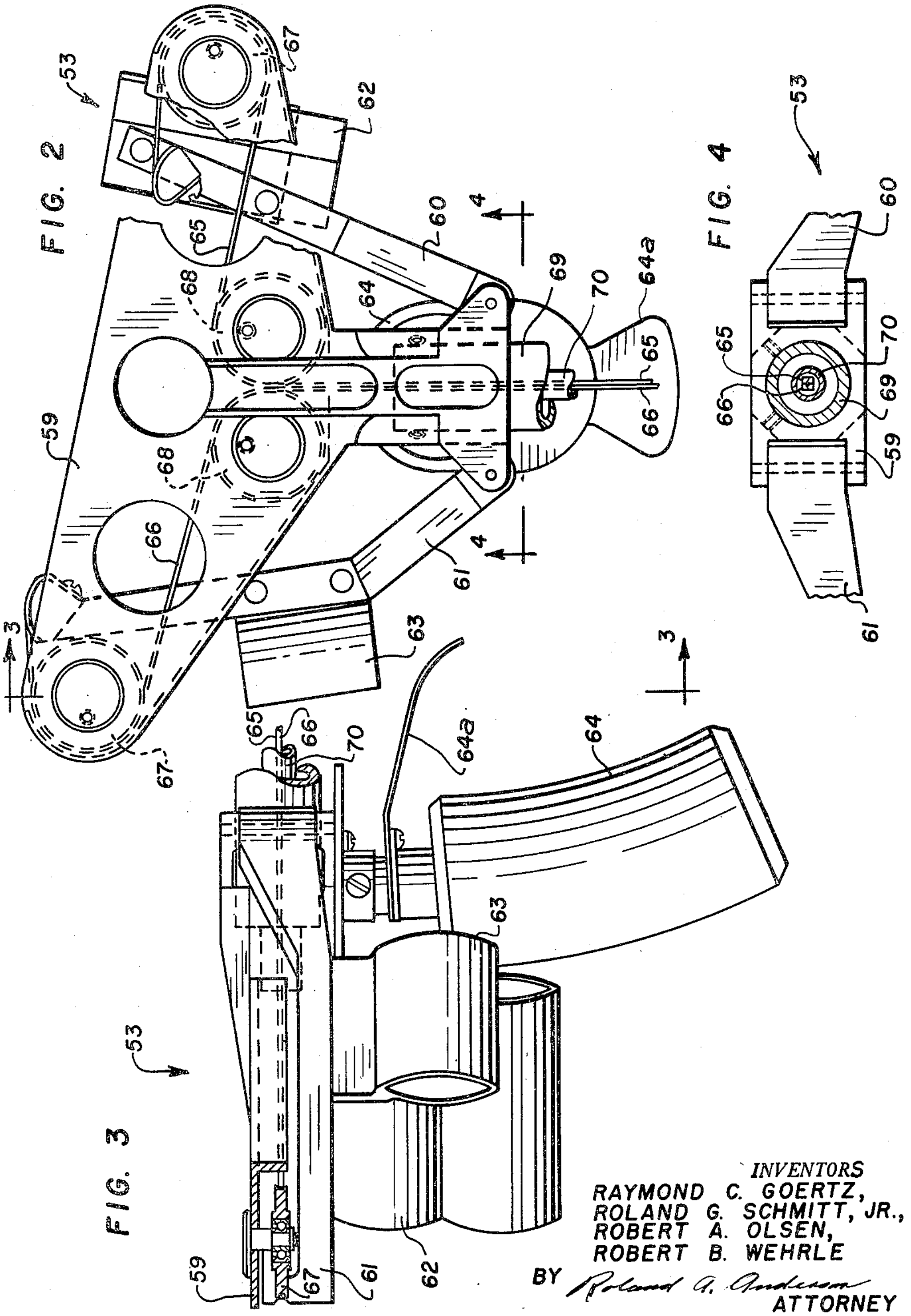
Fig. 2 is a plan view of the handle associated with the master arm of the manipulator.
Fig. 3 is an elevational view, partly in section, taken on the line 3—3 of Fig. 2 to show the handle.
Fig. 4 is a vertical sectional view taken on the line 4—4 of Fig. 2.

As shown in Figs. 2, 3, and 4, the handle 53 comprises a generally T-shaped support 59, levers 60 and 61 pivotally connected to the support, finger holds 62 for two fingers secured to the lever 60, a thumb hold 63 secured to the lever 61, a palm rest 64, a guard 64*a*, and cables 65 and 66 connected to the free outer ends of the levers 60 and 61, respectively. The cables 65 and 66 extend outwardly from the levers 60 and 61 over pulleys 67, thence inwardly over pulleys 68, and thence alongside one another through a tubular shaft 69 and through a tubular shank 70 positioned therewithin. The pulleys 67 and 68 are journaled on the underside of the T-shaped support 59, which is secured to the tubular shaft 69 for rotation therewith.

Figure 11:
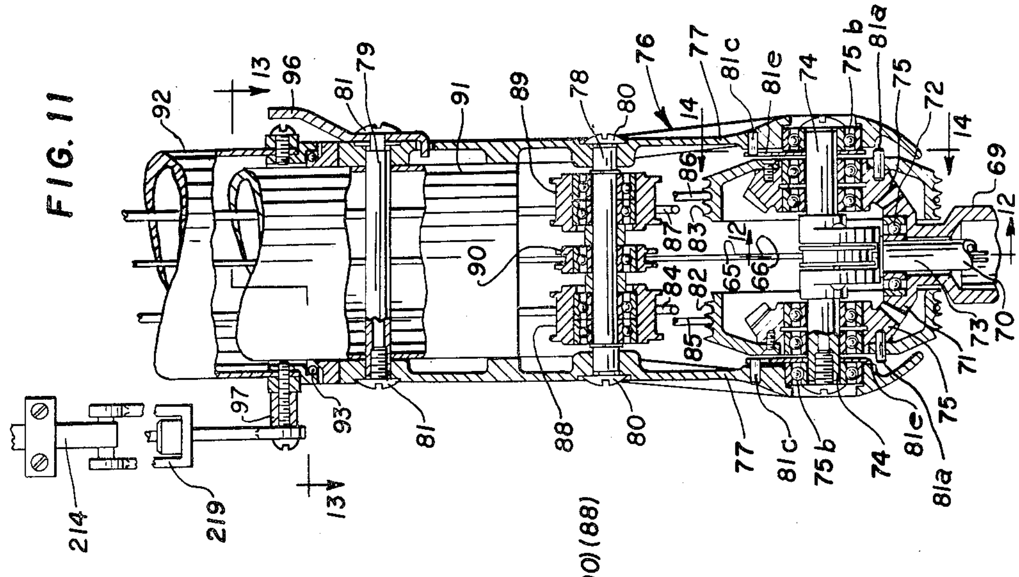
Fig. 11 is a vertical sectional view taken on the line 11—11 of Fig. 10.

As shown in Fig. 11, the tubular shaft 69 terminates in a beveled gear 71 at the end remote from the support 59 and is journaled and supported at this end on the shank 70 by means of a ball bearing 72. The other end of the tubular shaft 69 is supported upon the shank 70 by a ball bearing, not shown, which is like a ball bearing 72*a* (Fig. 9) used in the grasper 54. This unillustrated bearing serves to retain the shaft 69 against axial movement on the shank 70.

Figures 9, 12:
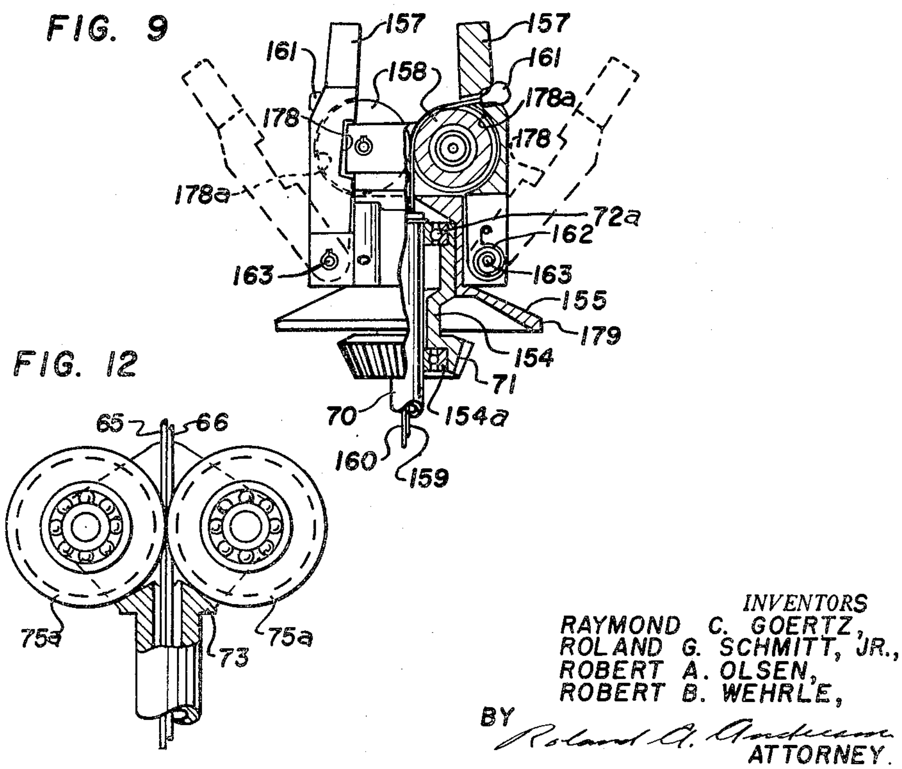
Fig. 9 is a plan view, partially in section, of the carrier for the grasper.
Fig. 12 is a vertical sectional view taken on the line 12—12 of Fig. 11 showing the cables for opening and closing the grasper and rollers guiding the cables.
Figure 14:
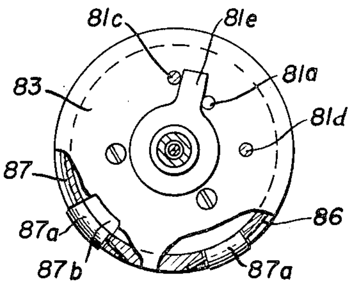
Fig. 14 is a vertical sectional view taken on the line 14—14 of Fig. 11 and showing anchors for cables controlling angular movement of the handle and stops for limiting such angular movement.

As shown in Fig. 11, the shank 70 is part of a yoke 73 which also has trunnions 74 upon which bevel gears 75 are journaled which mesh with the bevel gear 71. As shown in Fig. 12, the yoke 73 also carries rotatable guides 75*a* for the cables 65 and 66. Again with reference to Fig. 11, the trunnions in turn are journaled by bearings 75*b* in a housing 76 which is formed of complementary halves 77 which are secured to one another by means of sleeves 78 and 79 and screws 80 and 81 threaded into the ends of the sleeves 78 and 79, respectively. Angular movement of the gears 75 is limited by a projection 81*a* set in each bevel gear 75, projections 81*c* and 81*d* set in each housing half 77, and lazy-washers 81*e* mounted on each trunnion 74 outward of the associated gear 75, as shown in Fig. 14. Counterclockwise movement of each gear 75 is limited to the position shown in Fig. 14, in which the lazy-washer 81*e* engages projection 81*c* and is engaged by the projection 81*a*. Clockwise movement of each gear 75 is limited to the position in which the lazy-washer 81*e* engages the projection 81*d* and is engaged by the projection 81*a*. Thus each gear 75 is permitted about 410° of movement.

Take-up drums 82 and 83 are secured to the beveled gears 75 for rotation therewith. Cables 84 and 85 are trained over take-up drum 82 and have their ends secured thereto, in the manner shown for cables 86 and 87, which are trained over take-up drum 83, and have their ends secured thereto by plugs 87*a* fixed to the cables and placed in recesses 87*b* in the drum, as shown in Fig. 14.

Figure 13:
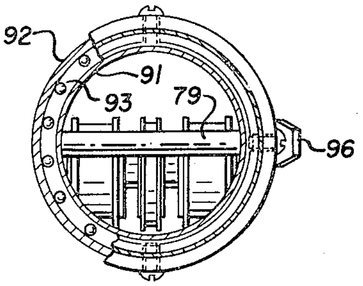
Fig. 13 is a horizontal sectional view taken on the line 13—13 of Fig. 11 and showing a bearing providing for rotation of the master arm.

The cables 84 and 85 are guided over a pulley 88 journaled on the sleeve 78. Cables 86 and 87 are guided over a pulley 89 journaled on the sleeve 78. A pulley 90 which is journaled on the sleeve 78 guides the cables 65 and 66 which are connected to the levers 60 and 61 in the handle 53. The cables 65, 66, 84, 85, 86 and 87 extend upwardly from the pulleys 90, 88, and 89 through an inner rotatable tube 91 to which the housing halves 77 are secured by means of the sleeve 79 and screws 81. The lower end of the rotatable tube 91 is journaled on the lower end of an outer nonrotatable tube 92 by means of a ball bearing 93, as shown in Figs. 11 and 13. Rotation of the inner tube 91 with respect to the outer tube 92 is limited to slightly less than 360° by means of stop members 96 and 97, which engage one another when the tube 91 is rotated. The stop member 96 is secured to the housing 76 by one screw 81, and the stop member 97 is secured to the exterior of the lower end of the tube 92.

Figure 22:
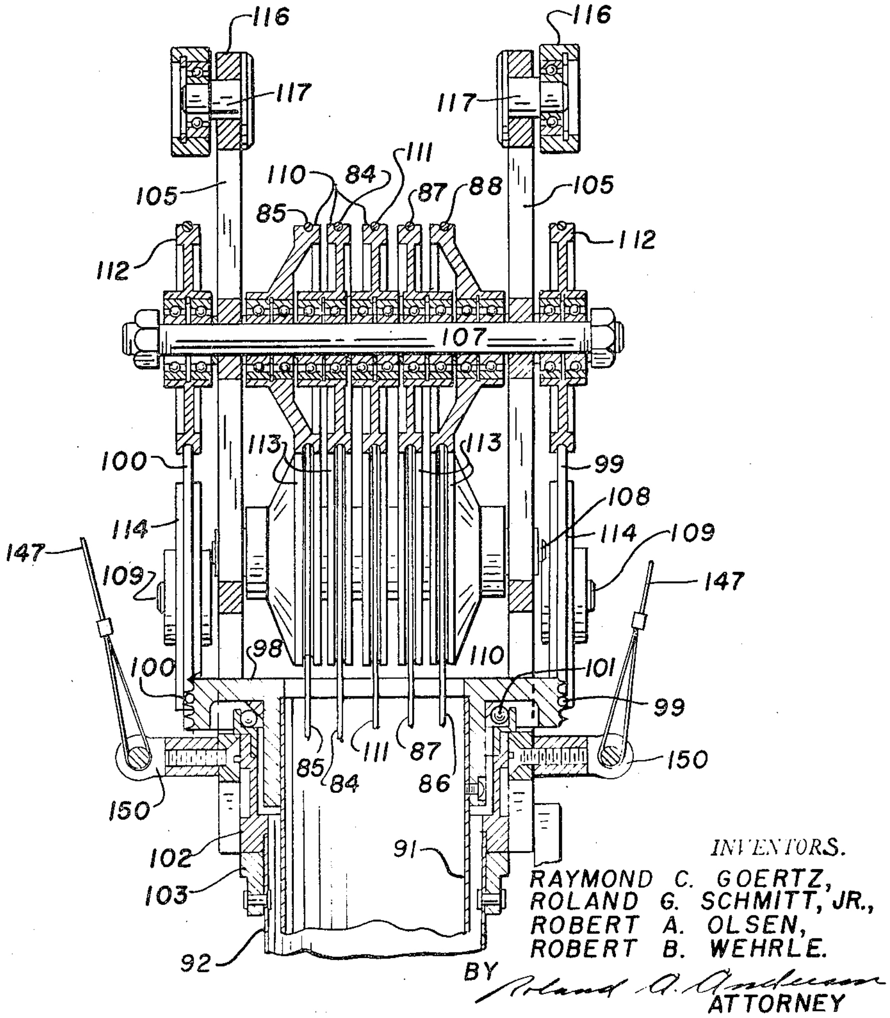
Fig. 22 is a vertical sectional view taken on the line 22—22 of Fig. 21 and incidentally shows the portion of the master arm within the area 22 of Fig. 16.
Figure 21:
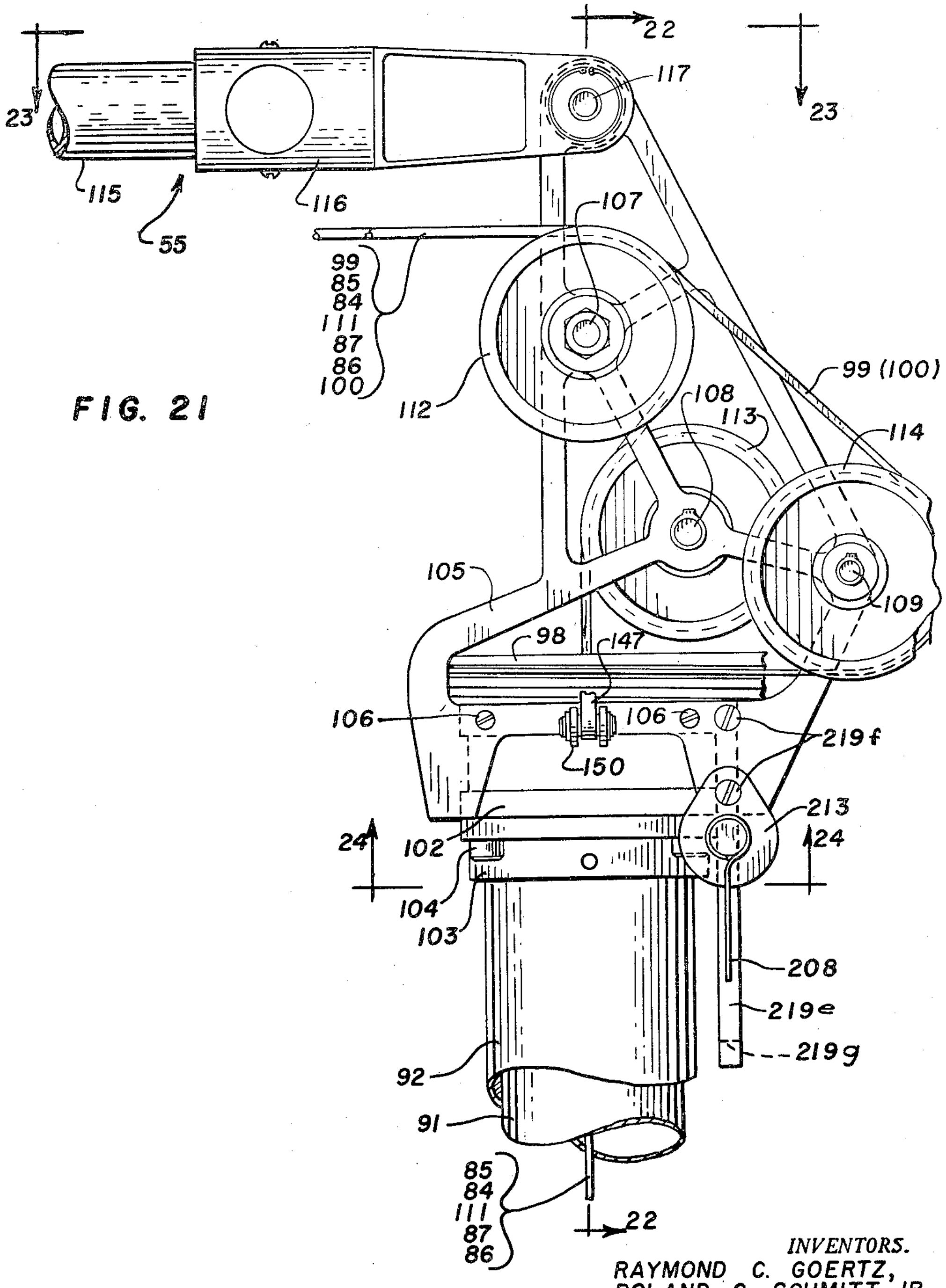
Fig. 21 is a fragmentary elevational view of the upper end of the master arm and a link that interconnects the master and slave arms.
Figure 24:
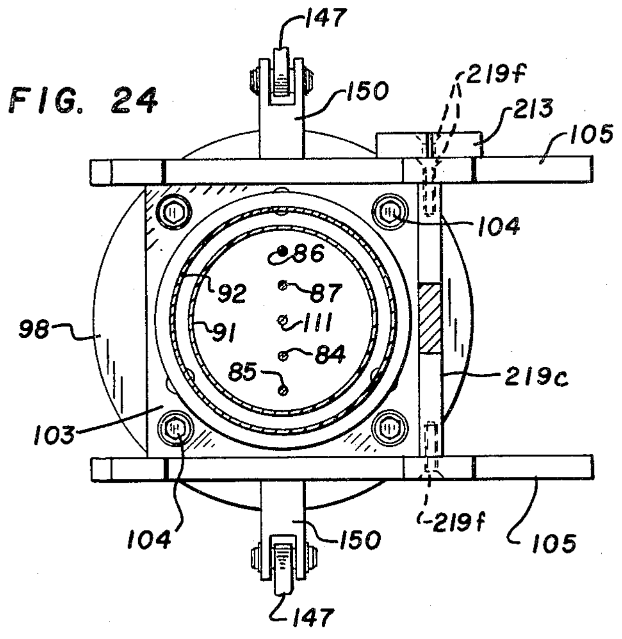
Fig. 24 is a fragmentary horizontal sectional view taken on the line 24—24 of Fig. 21.

As shown in Figs. 21 and 22, a take-up device 98 is secured to the upper end of the inner tube 91. The ends of cables 99 and 100 are trained over the take-up device 98 and secured thereto. The upper end of the inner tube 91 is journaled on the upper end of the outer tube 92 by means of a ball bearing 101 which includes a casting 102 and an insert in the lower side of the take-up device 98. The casting 102 rests on a collar 103, which is secured to the upper end of the outer tube 92, as shown in Fig. 22. As shown in Fig. 24, the portion of the collar 103 attached to the tube 92 is round, and another portion of collar 103 is rectangular and is attached by screws 104 to the casting 102, which is also rectangular. As shown in Fig. 21, side pieces 105 are secured by screws 106 to the collar 102 and serve to mount three shafts 107, 108, and 109. Upon the shaft 107 there are journaled between the side pieces 105 five pulleys 110 over which the cables 84, 85, 86 and 87 and a cable 111, connected (Fig. 28) with the cables 65 and 66, are guided. Outward of the side pieces 105 the shaft 107 journals pulleys 112 over which the cables 99 and 100 are trained. Upon the shaft 108 and between side pieces 105 there are journaled five pulleys 113 over which the cables 84, 85, 86, 87, and 111 are trained. Outside the side pieces the shaft 109 journals two pulleys 114 over which the cables 99 and 100 are trained.

Figure 23:
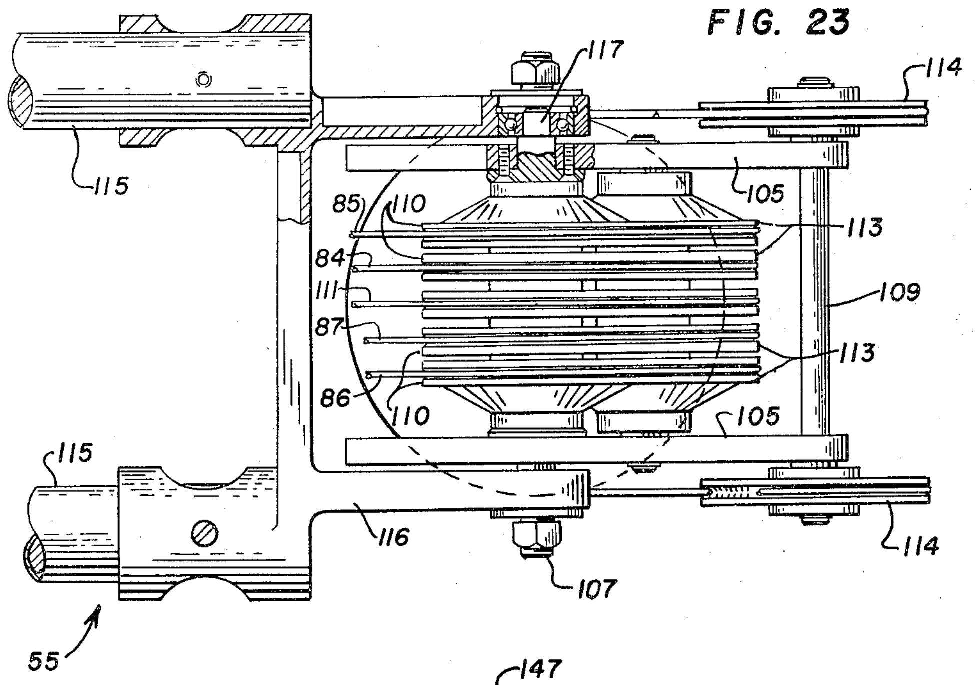
Fig. 23 is a fragmentary horizontal view, partially in section, taken on the line 23—23 of Fig. 21.

As shown in Fig. 23, the link 55 comprises two spaced parallel hollow rods 115 and a U-shaped bracket 116 to which the rods 115 are secured to one end. The bracket 116 is journaled on stub shafts 117 secured to the side pieces 105.

As shown in Figs. 17 to 20, the outer nonrotatable tube 92 of the master arm 51 is slidably mounted for axial movement within a tubular section 118 by means of a lower set of three rollers 119 and an upper set of three rollers 120. The rollers 119 and 120 extend through slots formed in collars 121 and 122, respectively, and are journaled therein. The collars 121 and 122 are secured to the lower and upper ends of the tubular section 118, respectively.

Figure 18:
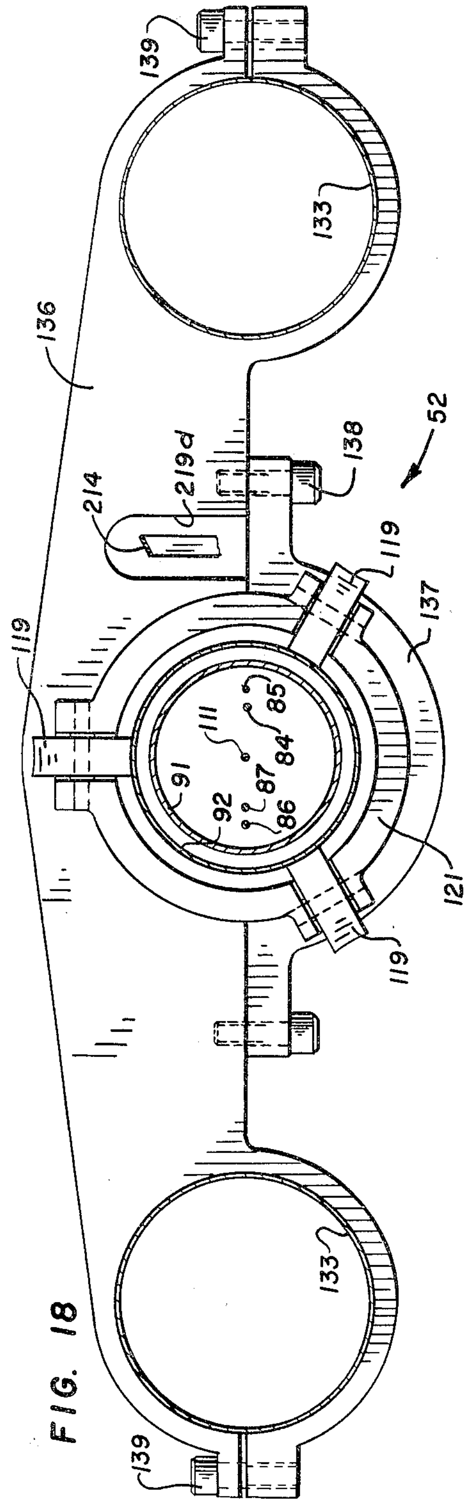
Fig. 18 is a horizontal sectional view taken on the line 18—18 of Fig. 17.
Figure 17:
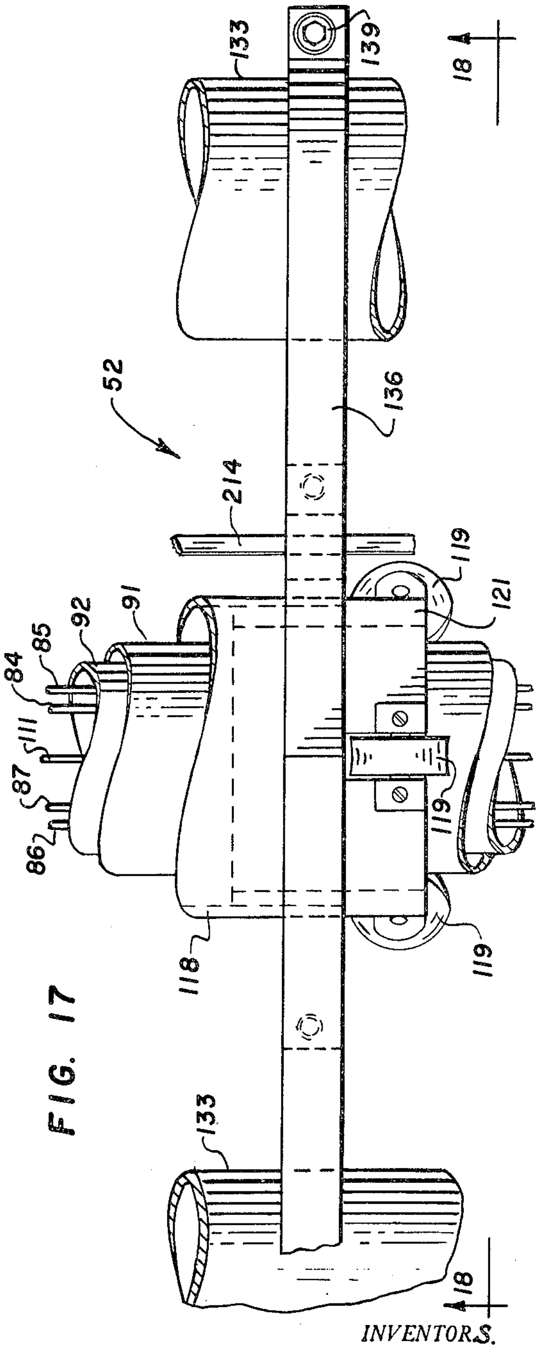
Fig. 17 is a fragmentary elevational view showing the portion of the master arm within the area 17 in Fig. 16, more particularly, a lower bracket that interconnects counterweight guides and a tubular section in which the master arm is mounted for vertical axial movement.
Figure 19:
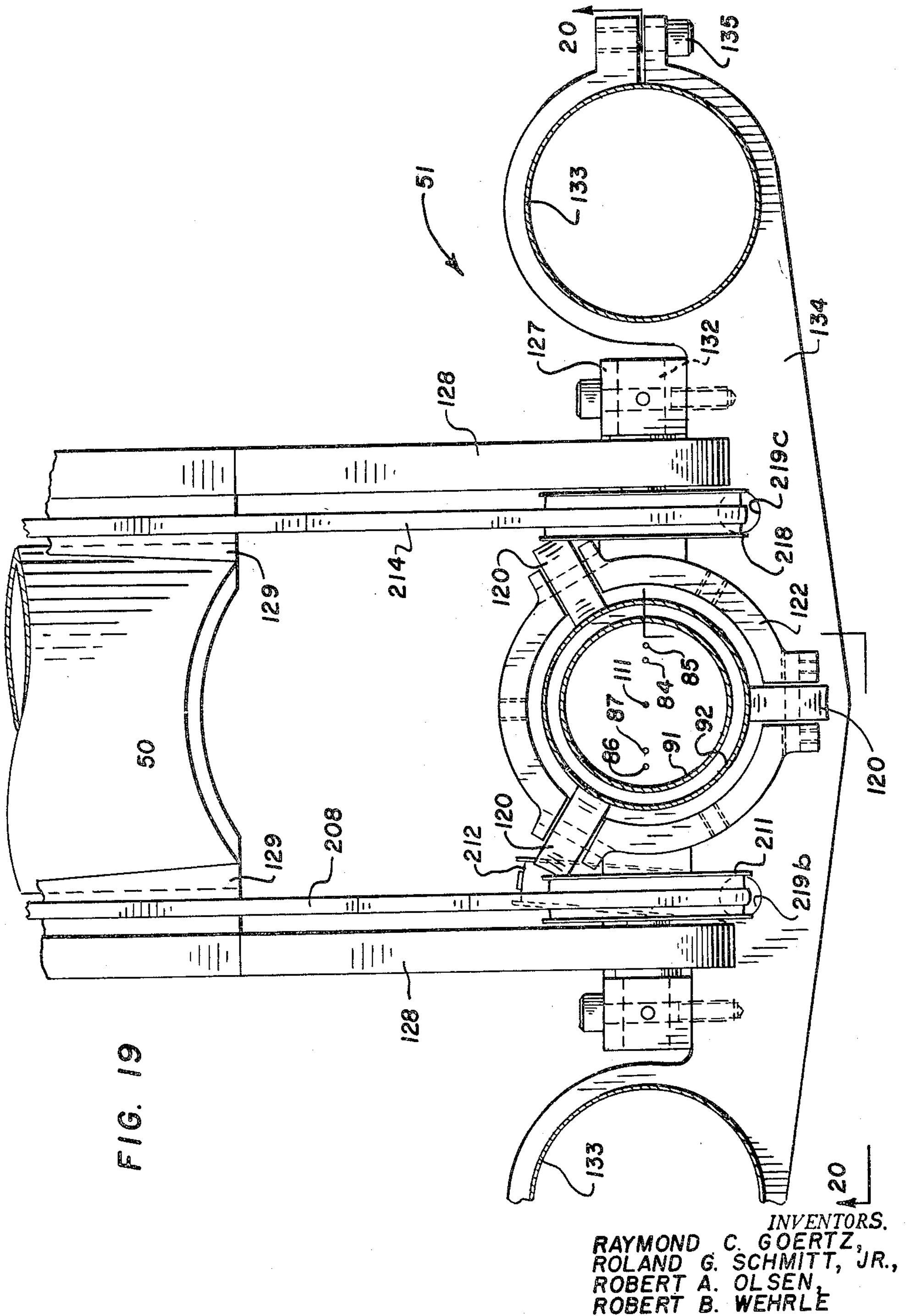
Fig. 19 is a fragmentary horizontal view, partly in section, showing how a horizontal support of the manipulator is connected to the master arm.
Figure 20:
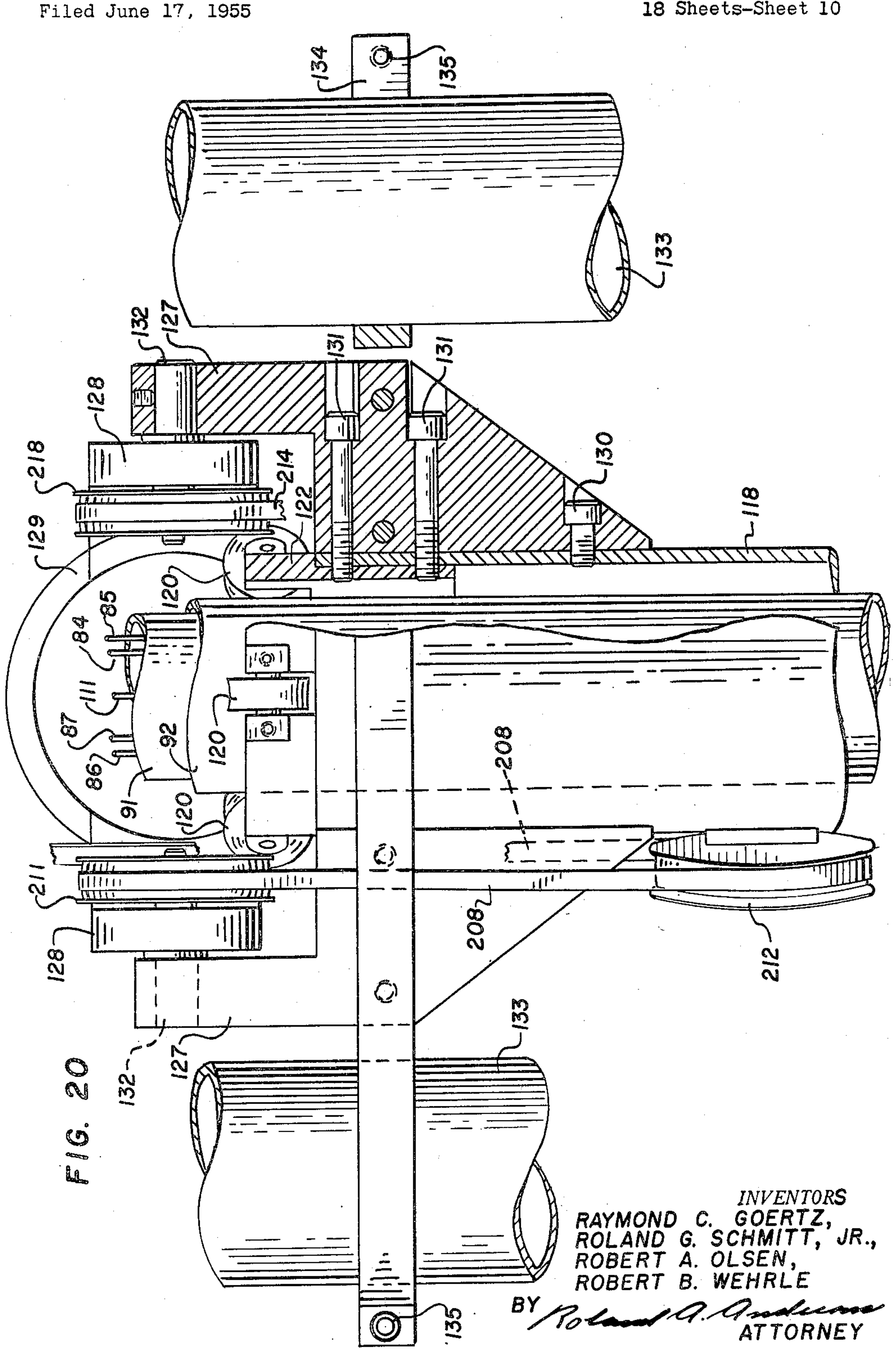
Fig. 20 is a fragmentary elevational view, partly in section, taken on the line 20—20 of Fig. 19, and incidentally shows the portion of the master arm within the area 20 of Fig. 16.

As shown in Figs. 19 and 20, the tubular section 118 is connected to one end of the tubular support 50 by means of posts 127, legs 128 and spacer blocks 129. The posts 127 are secured to the tubular section 118 by screws 130 and 131, the screws 131 also serving to secure the upper collar 122 to the tubular section 118. The legs 128 are secured to the end of the support 50 with the spacer blocks 129 therebetween and are pivotally connected to the posts 127 by being journaled upon shafts 132 secured to the posts. Counterweight guides in the form of tubes 133 are positioned on opposite sides of the tubular section 118 in spaced relation thereto and are secured to the posts 127 by means of a bracket 134, to which the counterweight tubes 133 are clamped by screws 135. As shown in Figs. 17 and 18, the counterweight tubes 133 are secured to the lower end of the tubular section 118 by means of a bracket 136 which is clamped to the tubular section 118 by means of a strap 137, fixed to the bracket 136 by screws 138. The counterweight tubes 133 are clamped in the bracket 136 by screws 139.

Figure 16:
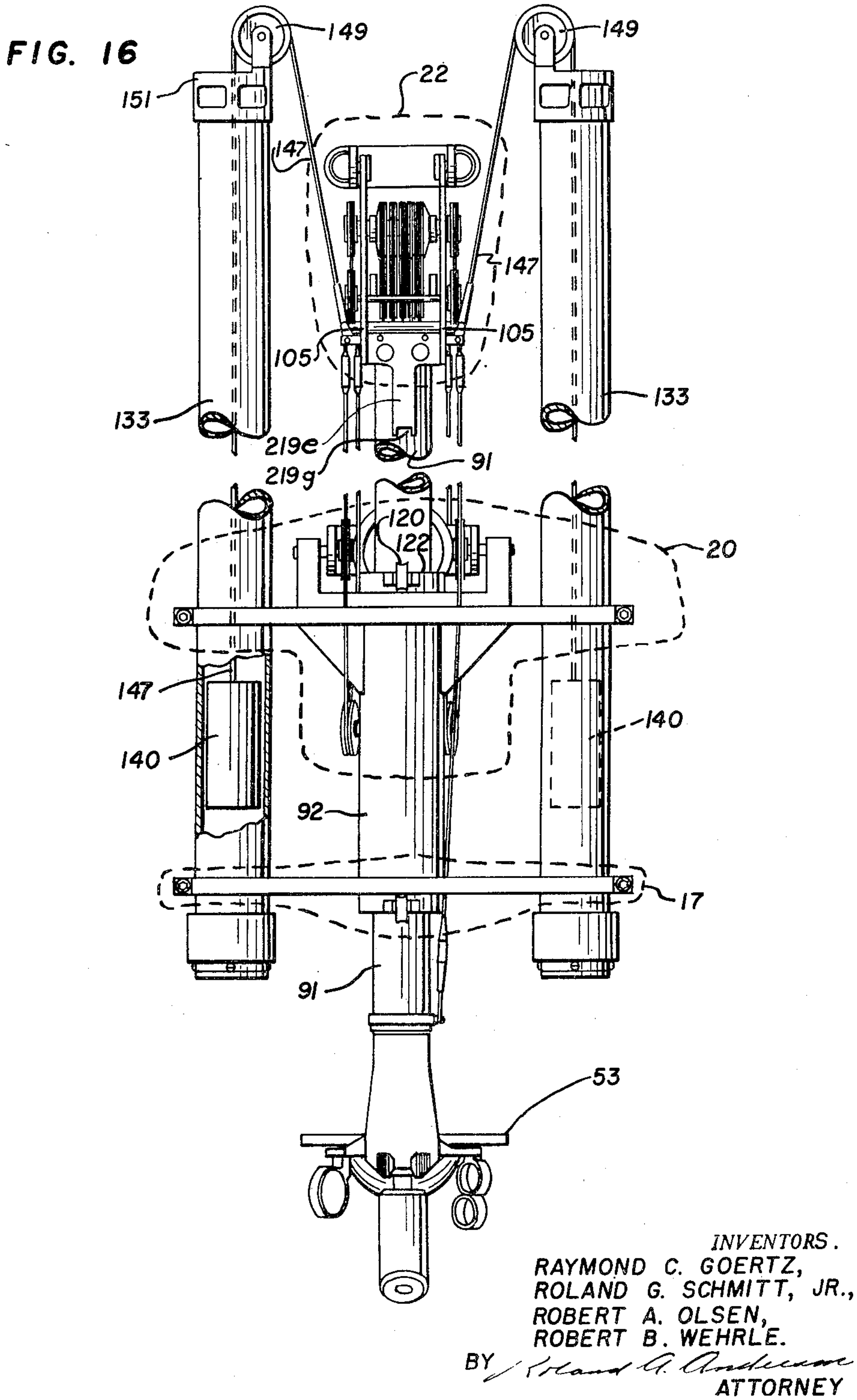
Fig. 16 is an end view of the master arm of the manipulator.

As shown in Fig. 16, there is mounted in each guide 133 a counterweight 140, which is adapted to ride up and down in the counterweight guide 133 on upper and lower rollers that may be journaled in the counterweight as shown in Fig. 21 of copending Goertz et al. application, Serial No. 501,008 filed April 12, 1955. Each counterweight 140 is suspended in its counterweight guide 133 from a tape 147 which extends upwardly out of the counterweight guide over a pulley 149 and thence downwardly to a connection with a member 150 secured to one side piece 105 on the upper end of the outer tube 92, as shown in Figs. 22 and 24. The pulley 149 is journaled on a bracket 151 secured to the upper end of the counterweight guide 133.

Figures 10, 15:
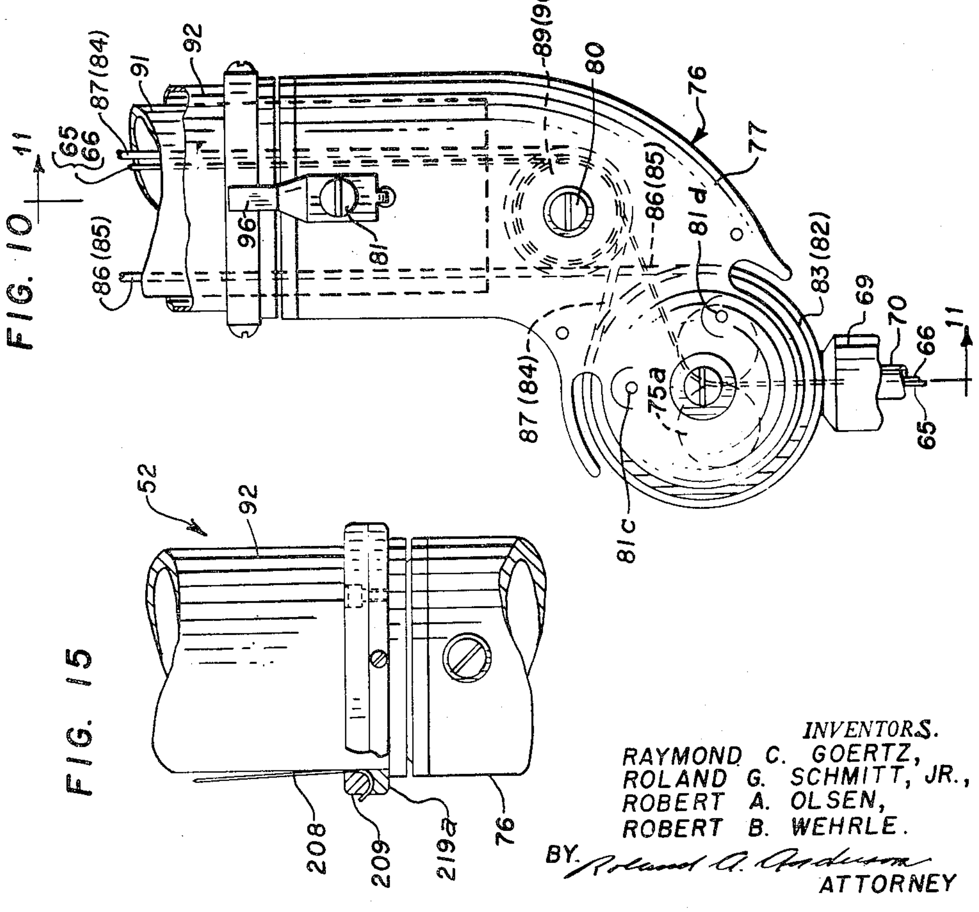
Fig. 10 is a fragmentary elevational view showing the lower end of the master arm to which the handle is attached.
Fig. 15 is a fragmentary elevational view, partially in section, showing how a tape for adjusting the slave arm vertically is anchored on the slave arm.

The grasper 54, which is illustrated in detail in Figs. 5–9, is connected with the lower end of the slave arm 52 by means of parts similar to those shown in Figs. 10 and 11 for the connection of the handle 53 to the master arm 51. More specifically, the grasper 54 has a tubular shaft 154 which is integral with a bevel gear 71 meshing with bevel gears 75 (Fig. 11). The tubular shaft 154 is journaled by means of two bearings 72*a* and 154*a* upon a shank 70 forming part of the yoke 73 (Fig. 11). The bearing 72*a* also helps to prevent longitudinal movement of the tubular shaft 154 with respect to the shank 70 and thus hold the gear 71 in mesh with the gears 75. A carrier 155 is secured to the tubular shaft 154 for rotation therewith and provides pivotal mountings for two fingers 157 and rotatable support for two pulleys 158. Cables 159 and 160, which are connected to the cable 111 (Fig. 28), run through the shank 70 and over guides 158 and have their ends anchored in the fingers 157 by means of plugs 161 fixed to said ends. Each finger 157 is provided with a torsion spring 162 which is anchored to the finger and to a pivot 163 for the finger upon the carrier 155 so that the fingers are urged outwardly away from one another from the full-line position to the dotted-line position of Fig. 9.

Figures 5, 6, 7:
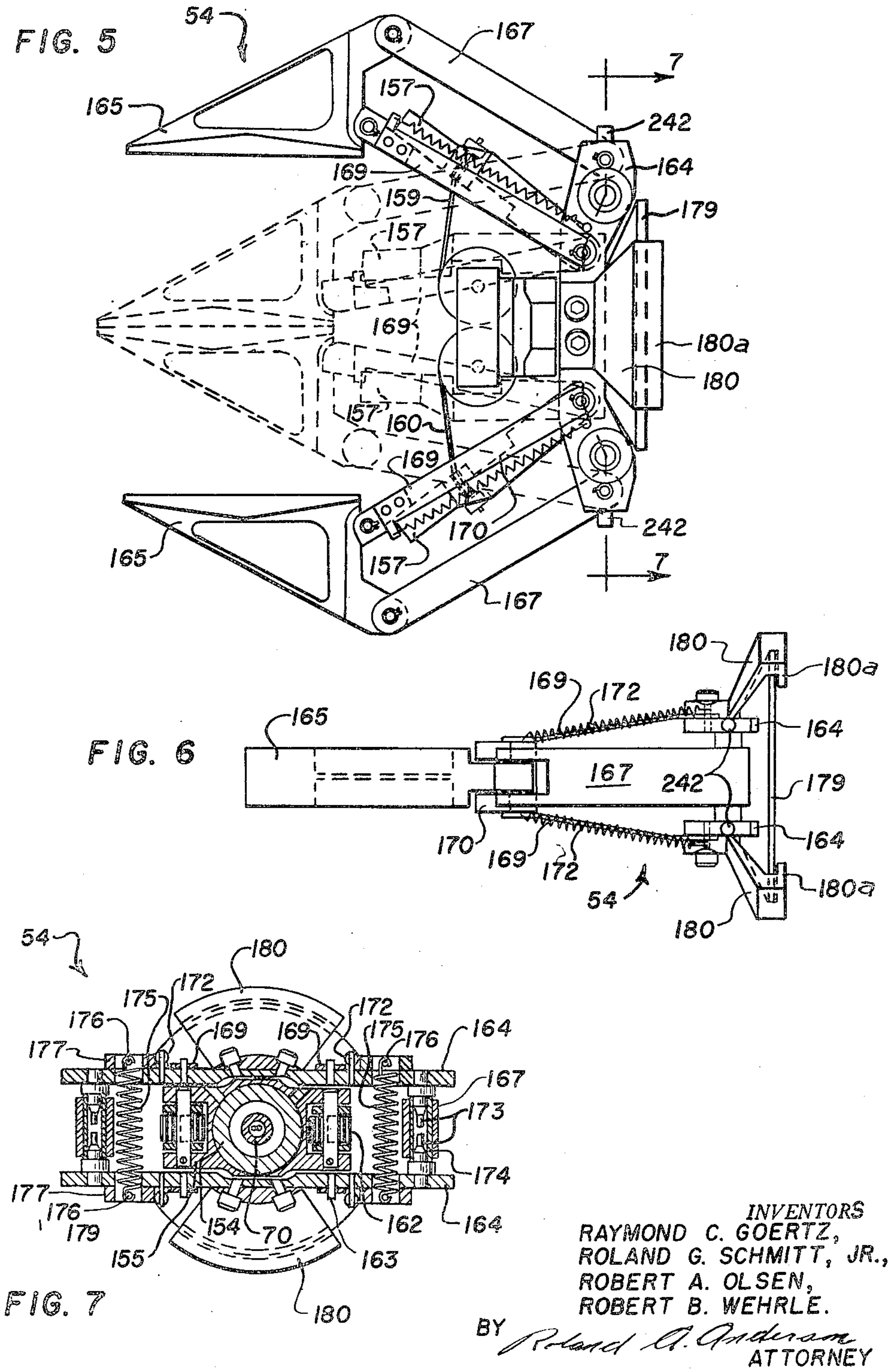
Fig. 5 is a plan view of the grasper and the carrier connecting it with the slave arm of the manipulator.
Fig. 6 is an elevational view of the grasper and the carrier.
Fig. 7 is a sectional view taken on the line 7—7 of Fig. 5.
Figure 8:
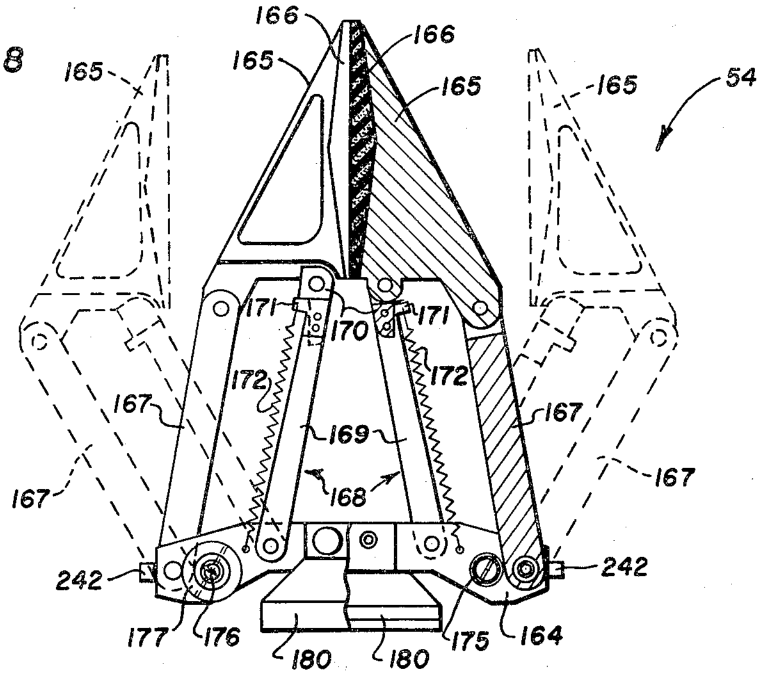
Fig. 8 is a plan view, partially in section, of the grasper.

As seen in Figs. 6, 7 and 8, the grasper 54 further includes a pair of side pieces 164, a pair of opposed mating jaws 165 provided with rubber inserts 166, and two pairs of generally parallel links 167 and 168 connecting the jaws 165 to the side pieces 164 for movement between the full-line position and dotted-line position of Fig. 8. Each link 168 comprises two link members 169 and a tie piece 170 riveted to and between the link members 169. The link members are pivotally connected to the outer sides of the side pieces 164, and tie pieces 170 are pivoted on the jaws 165. Each link member 169 is provided with a lateral projection 171 to which is connected a tension spring 172, which is also connected to one of the side pieces 164 so that the jaws 165 are urged from the full-line position to the dotted-line position of Fig. 8. The links 167 are outward of the links 168 and are pivotally connected to and between the side pieces 164, each shown in Fig. 7. For this purpose the side pieces 164 are provided with members 173 which project toward one another and mounting sleeves 174 upon which the outer links 167 are journaled.

Figures 27, 28, 29:
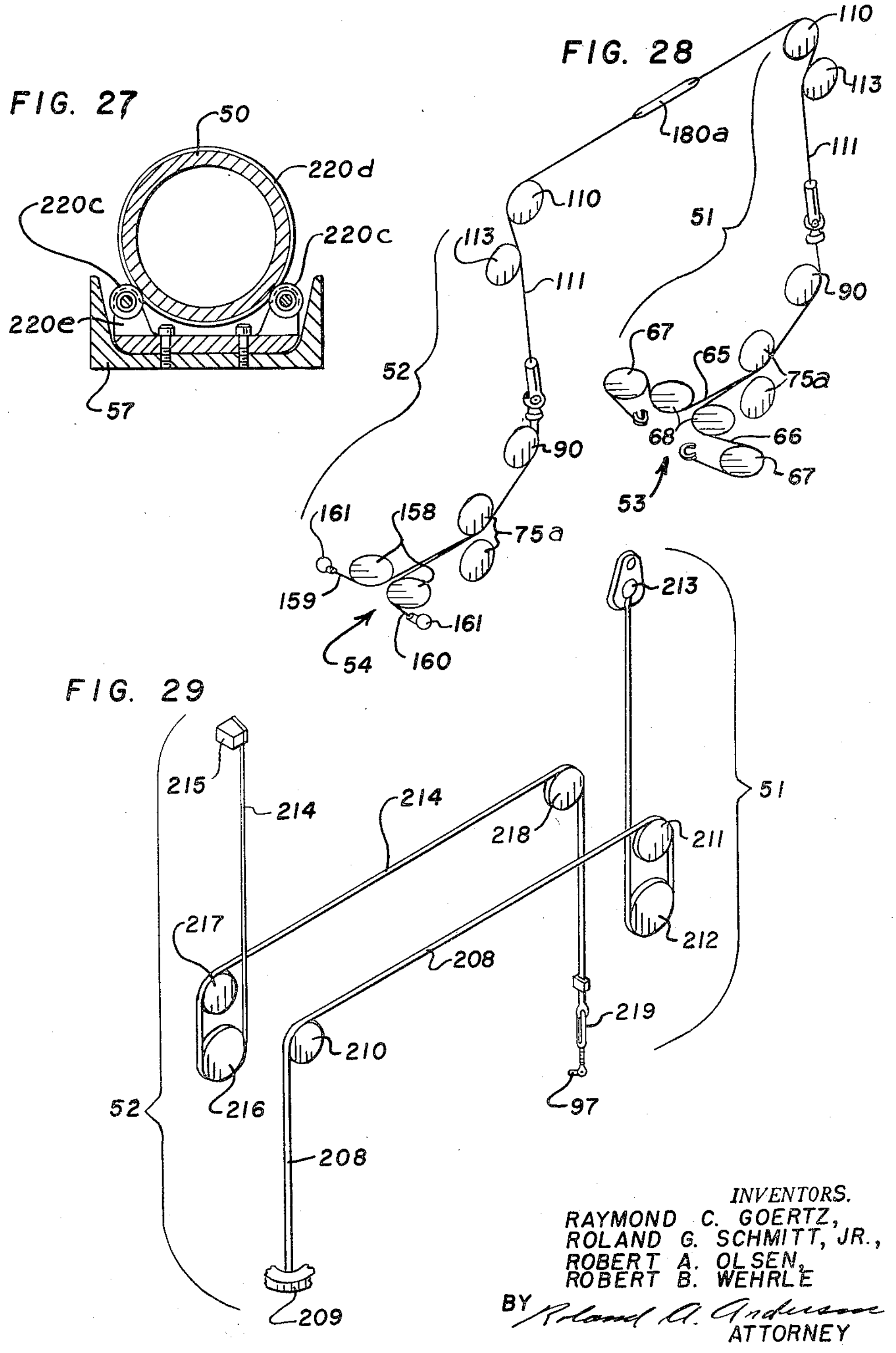
Fig. 27 is a vertical sectional view taken on the line 27—27 of Fig. 1 and showing the mounting of the horizontal support that ties the arms together.
Fig. 28 is a schematic perspective view of the cable that provides for opening and closing of the handle in response to opening and closing of the grasper.
Fig. 29 is a schematic perspective view of tapes through which vertical axial movement of the master arm is transmitted to the slave arm.

When the grasper 54 is mounted upon the lower end of the slave arm 52, the side pieces 164 engage flat sides of the carrier 155 either directly as shown in Fig. 7 or with the protective boot 55*a* between the side pieces 164 and the carrier 155. The side pieces 164 are urged toward one another and against the carrier 155 by means of tension springs 175 which have their ends anchored in pins 176 mounted in rings 177 secured to the outer sides of the side pieces 164. When as shown in Fig. 5, the grasper 54 is mounted upon the carrier 155, the tie pieces 170 of the links 168 are engaged by the fingers 157, since the springs 172 on the links 168 tend to move the tie pieces outwardly against the fingers farther than the fingers can go, outward movement of the fingers being limited by engagement of the levers 60 and 61 with the pulley guides 67 on the handle 53, as shown in Fig. 2, which engagement is communicated to the fingers 157 on the grasper 154 through the cables 65, 66, 111, 159, and 160 (Fig. 28). Recesses formed in the fingers 157 have oblong portions 178 to receive the carrier 155 and arcuate portions 178*a* therebetween to receive the pulleys 158, whereby the fingers 157 may move to the full-line position of Fig. 9. In the assembled position of Fig. 5, the grasper 54 is held upon the carrier 155 through an arcuate flange 179 formed on the carrier 155 and arcuate flange pieces 180 attached to the side pieces 164. The flange pieces 180 have inwardly directed ends 180*a* which hook over the flange 179.

When the jaws are to be moved to the closed or clamping position shown in dotted lines in Fig. 5, the fingers and thumb pieces 62 and 63 of the handle 53 of Fig. 2 are moved toward one another, causing the cables 65 and 66 to pull the cables 111, 159 and 160 (Fig. 28) and thus to bring the fingers 157 toward one another to the full-line position of Fig. 9. The fingers act through the tie pieces 170 on the links 168 to move the jaws 165 together. When pressure on the finger and thumb pieces 62 and 63 is released, the springs 172 on the grasper 54 move the jaws 165 outward away from one another. The cable 111 is actually formed of two sections interconnected by an adjustable element 180*a* through which slack in the cables 65, 66, 111, 159, and 160 may be taken up.

Figures 32, 33, 34:
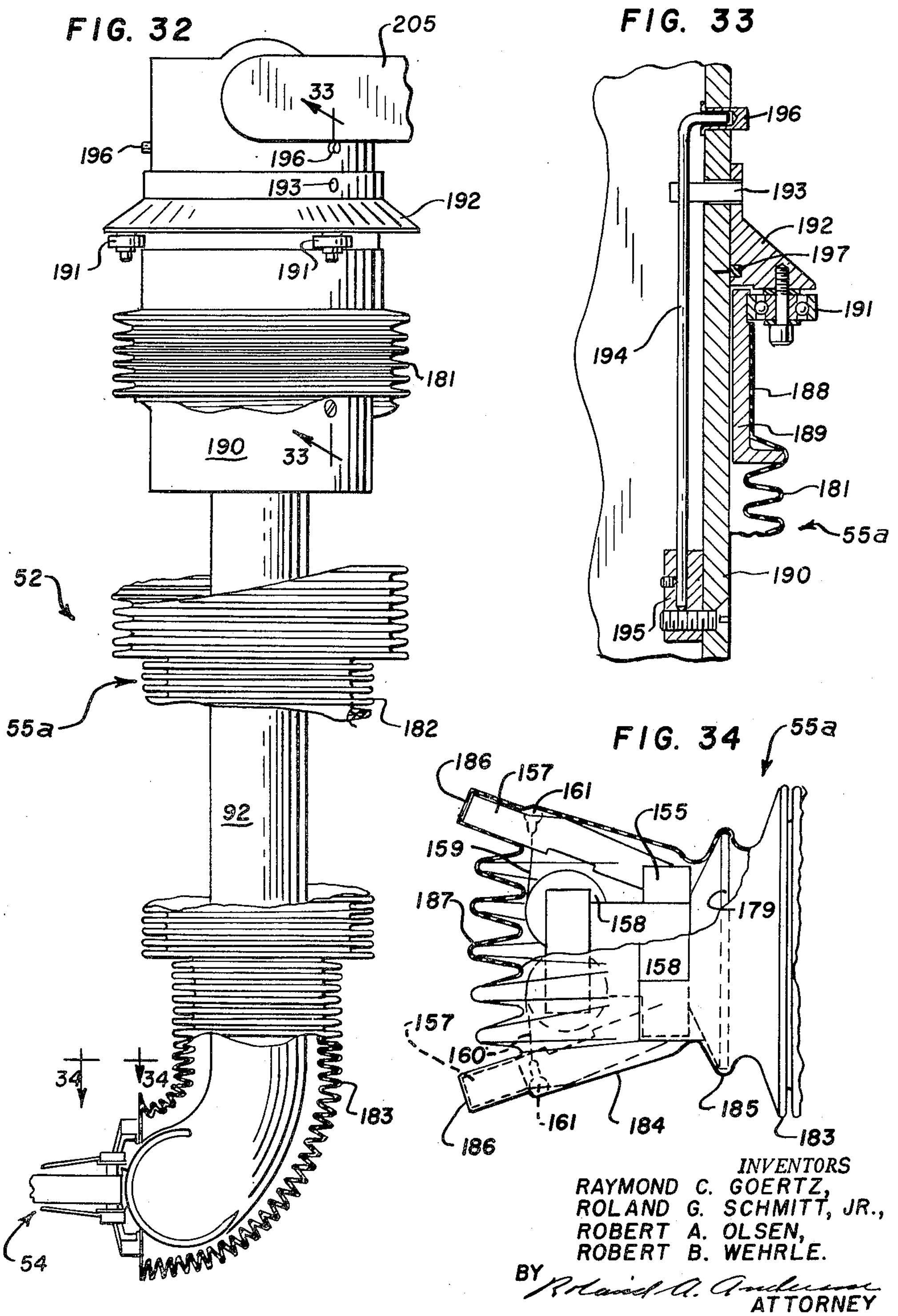
Fig. 32 is an elevational view, with parts broken away, showing the application of a protective boot to the slave arm.
Fig. 33 is a vertical sectional view taken on the line 33—33 of Fig. 32 and showing the journaling of the open end of the boot on the slave arm.
Fig. 34 is a fragmentary plan view, partly in section, taken on the line 34—34 of Fig. 32 and showing how a carrier and fingers for supporting and controlling the opening of the grasper fit within the closed end of the protective boot.

When the protective boot 55*a* is employed, it fits between the fingers 157 and the links 168 on the grasper 54. As shown in Figs. 32, 33, and 34, the boot 55*a* is formed of a suitable flexible material such as rubber and comprises three corrugated expanso-collapsible sections 181, 182 and 183, decreasing in diameter from one section to the next, and a closed end section 184, which is specially shaped at 185 to fit over the flange 179 on the carrier 155 and has two fingers 186 shaped to fit the fingers 157 and a corrugated portion 187 between the fingers 186 to permit the fingers 157 to move toward and away from one another as the jaws 165 are closed and opened. When the protective boot 55*a* is applied, the fingers 157 engage the tie pieces 170 on the links 168 of the grasper 54 through the boot fingers 186, and the portion 185 of the boot end is engaged by the flange pieces 180 of the grasper.

As shown in Figs. 32 and 33, the boot 55*a* has at its upper end adjacent the corrugated portion 181, a part 188 which is slipped over a flanged ring 189 which is journaled and carried on a tubular section 190 by means of three rollers 191 and a ring 192 detachably mounted on the tubular section 190. The rollers 191 are rotatably supported on the ring 192 which is pinned to the tubular section 190 by means of three retractable pins 193 which are carried on spring members 194 secured at their lower ends in pieces 195 attached to the inner side of the tubular section 190. The upper ends of the spring 194 engage depressible buttons 196 mounted in the tubular section 190. A seal 197 is mounted in a groove in the ring 192 so as to act between the ring 192 and the tubular section 190. The mounting of the upper open end of the boot 55*a* on the rings 189 and 192 and the rollers 191 permits the boot to have rotational movement with respect to the tubular section 190 and thus accommodates the various angular movements of the grasper 54.

Figure 25:
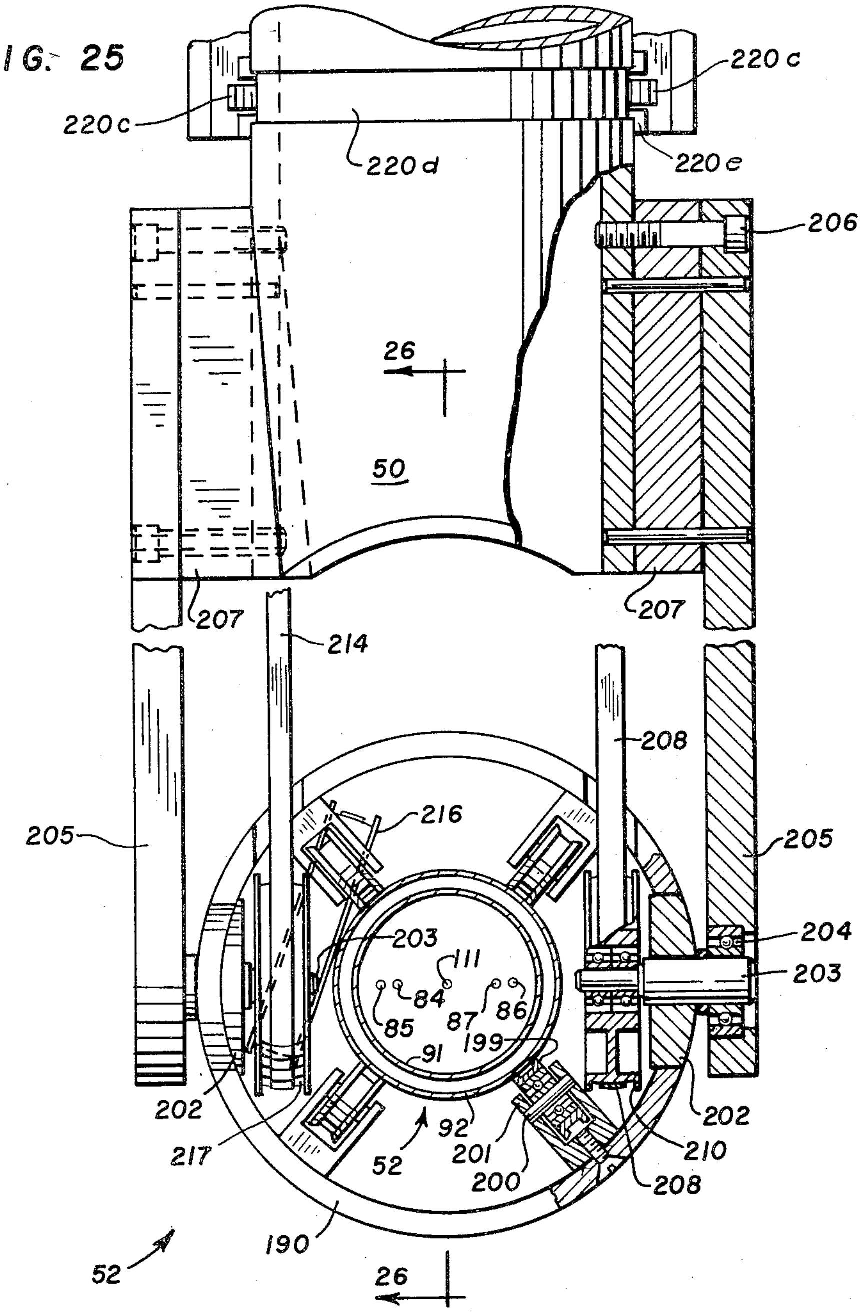
Fig. 25 is a fragmentary plan view of the slave arm and one end of the link interconnecting the arms.
Figure 26:
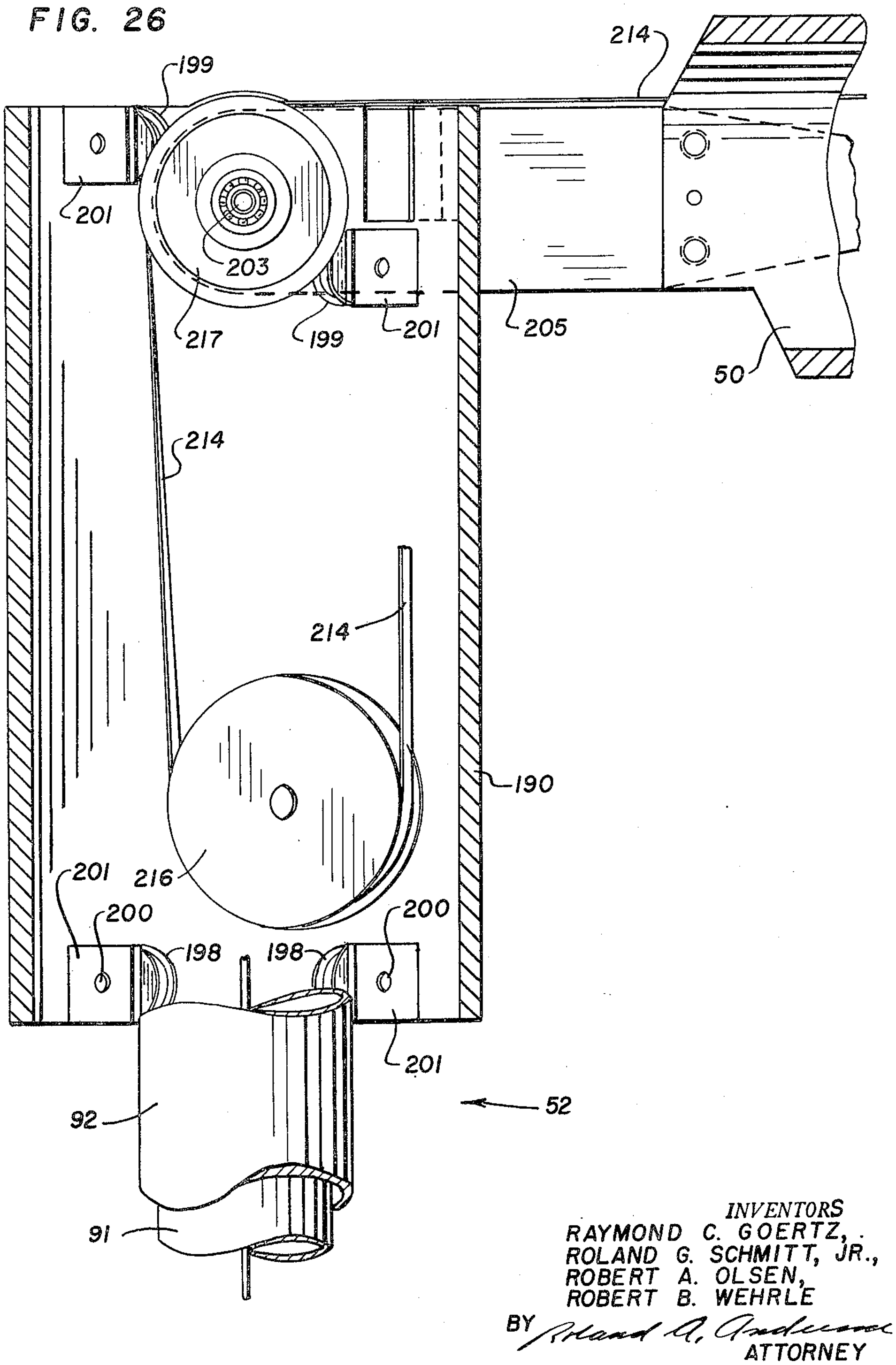
Fig. 26 is a vertical sectional view taken on the line 26—26 of Fig. 25.

As shown in Figs. 25 and 26, the tubular section 190 provides a slidable mounting for the slave arm 52. More specifically, the slave arm has an inner rotatable tube 91 and an outer nonrotatable tube 92 which are assembled and mounted with respect to one another as shown and described for the master arm 51 in Figs. 11 and 22. The outer tube 92 of the slave arm 52 is engaged by a set of four lower rollers 198 and a set of four upper rollers 199, which are grooved and are journaled on shafts 200 mounted in U-shaped pieces 201 fixed to the interior of the tubular section 190. Rollers 198 and 199 permit the slave arm 52 to have longitudinal or axial movement with respect to the tubular section 190. The upper end of the tubular section 190 has inserts 202 in which are mounted shafts 203 which are journaled in bearings 204 carried by legs 205. The legs 205 are secured to the horizontal support by means of screws 206, spacer blocks 207 being inserted between the legs and the support. The legs 205 are attached to the end of the support 50 opposite that to which the legs 128 (Fig. 19) for the master arm 51 are attached.

As shown in Fig. 1, the upper end of the slave arm 52 is connected to the rods 115 of the link 55 by means of U-shaped bracket 116 and side pieces 105 in the manner described for the master arm 51 and shown in Figs. 21 to 24. The side pieces 105 on the slave arm 52 carry pulleys 110, 112, 113, and 114, which are similar to corresponding pulleys on the upper end of the master arm 51. Cables 99, 85, 84, 111, 87, 86, and 100 engage these pulleys in a manner described for the master arm 51 with reference to Fig. 22. Cables 99 and 100 also engage a take-up device 98 secured to the upper end of the inner tube 91 of the slave arm 52, as described for the master arm 51 with reference to Fig. 22.

As previously stated, the master arm 51 and the slave arm 52 are mounted respectively in the tubular section 118 and the tubular section 190 for longitudinal movement with respect thereto. The master and slave arms are interconnected as shown in Fig. 29 so that axial movement of the master arm will produce axial movement of the slave arm. A tape 208 has one end clamped by a ring 209 to the lower end of the outer tube 92 on the slave arm and extends upward along the slave arm from the ring 209 and over a pulley 210, thence along the horizontal support 50 to a pulley 211, thence downward to a pulley 212, and thence upward along the master arm to a clamp 213 on the upper end thereof. A tape 214 clamped by a block 215 at the upper end of the slave arm 52 extends from the block downward along the slave arm to and over a pulley 216, thence upward to and over a pulley 217, thence along the horizontal support 50 to and over a pulley 218, and thence downward along the master arm to a member 219 which is adjustably connected to the stop 97 on the master arm.

As shown in Fig. 15, the ring 209 clamps one end of the tape 208 against a ring **219*a* to which it is secured and which is in turn secured to the lower end of the outer tube 92 of the slave arm 52. As shown in Fig. 25, the tape 208 goes upwardly through the tubular structure 190, over the pulley 210 and along the horizontal support 50; and the pulley 210 is journaled on one of the shafts 203. Fig. 19 shows the tape 208 extending along the horizontal support 50, over the pulley 211, and down through an opening 219*b* in the bracket 134. Fig. 20 shows the pulley 211 to be journaled on one of the shafts 132. Further, as shown in Fig. 20, the tape 208 extends downwardly from the pulley 210 over the pulley 211 which is journaled on the exterior of the tubular structure 118. As shown in Figs. 19, 20, and 21, the tape 208 extends upwardly from the pulley 212 to the clamp 213 which is secured to one of the side pieces 105 at the upper end of the master arm 51.**

As shown in Fig. 26, the tape 214, which comes from the clamp 215 at the upper end of the slave arm 52, extends downwardly into the tubular structure 190 over the pulley 216 which is journaled on the interior of the tubular structure 190. From the pulley 216 the tape 214 extends upwardly to and over the pulley 217 which is shown by Figs. 25 and 26 to be journaled on one of the shafts 203. Fig. 19 shows the tape 214 extending along the horizontal support 50 to and over the pulley 218 which is journaled on one of the shafts 132. As shown in Figs. 17 to 20, the tape 214 extends downwardly from the pulley 218 through openings **219*c* and 219*d* in the brackets 134 and 136 to the fastening device 219, which is shown in Fig. 11, to be attached to the projection 97 secured to the lower end of the outer tube 92 of the master arm 51.**

When the master arm 51 moves upward, a pull is transmitted by the upper end of the master arm through the clamp 213 to the tape 208 which transmits a pull through the ring 209 to the lower end of the slave arm 52 to move it upwards. When the master arm 51 is moved downwards, pull is transmitted by the lower end of the master arm to the fastening device 219 to the tape 214, which transmits pull through the block 215 to the upper end of the slave arm 52. Downward movement of the master and slave arms is limited by engagement of a T-shaped member **219*e* on the upper end of the master arm 51 with the collar 122 at the top of the tubular section 118. As shown in Figs. 16, 21, and 24, the member 219*e* is secured by screws 219*f* to and between the side pieces 105 and has a notch 219*g* at its lower end to prevent contact between the member 219*e* and one upper roller 120. Incidentally, one of the screws 219*f* secures the clamp 213 for the tape 214 to the one side piece 105. The block 215 which clamps the tape 214 to the upper end of the slave arm is secured in the same manner as the T-shaped member 219*e*, that is, by screws to and between the side pieces 105** on the upper end of the slave arm.

Figures 30, 31:
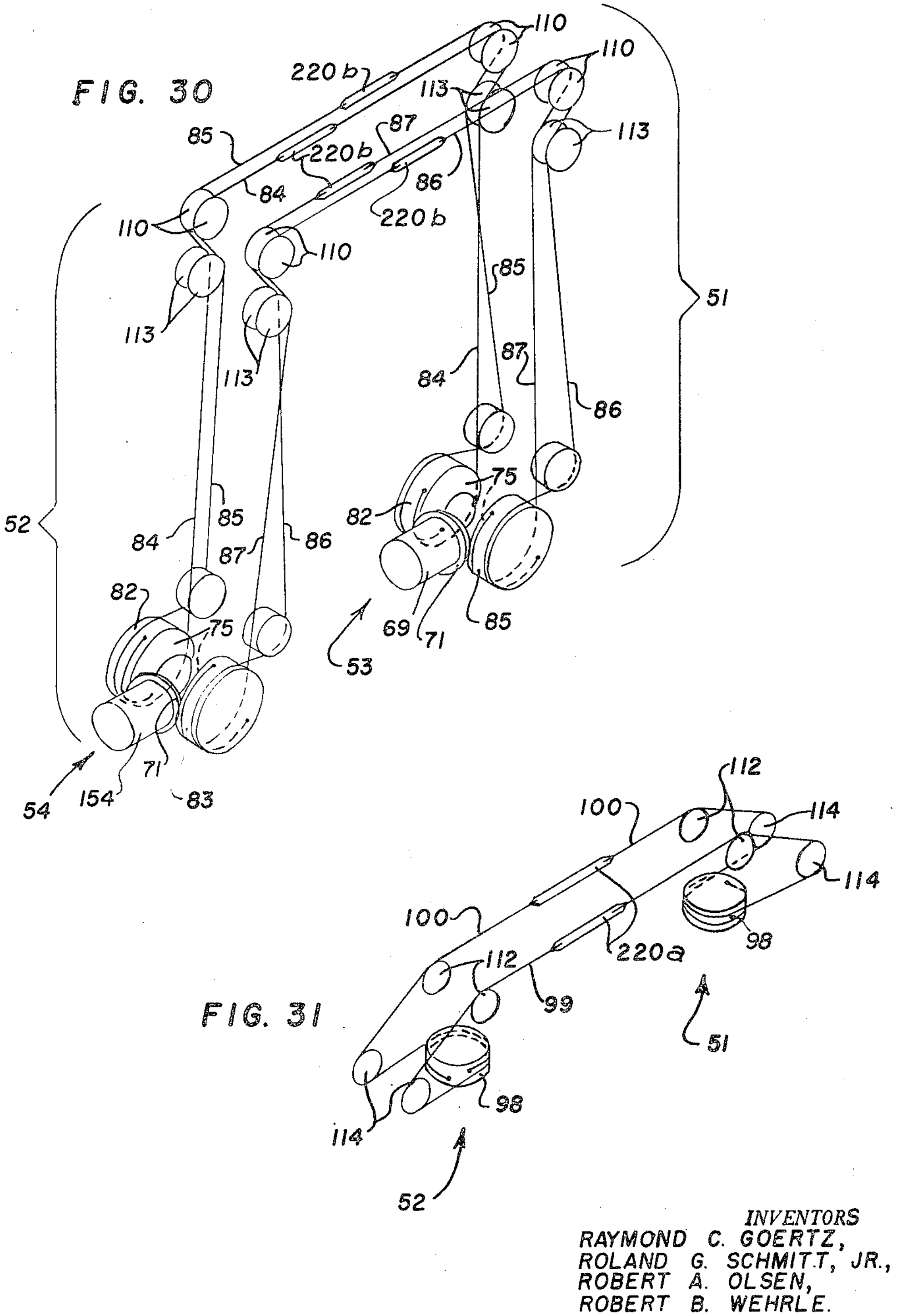
Fig. 30 is a schematic perspective view showing how rotation of the handle about two axes in the base of the master arm produces rotation of the grasper about two axes in the base of the slave arm.
Fig. 31 is a schematic perspective view illustrating the interconnection between the arms which enables rotation of the master arm about its own axis to produce corresponding rotation of the slave arm.

Rotation or angular movement of the handle 53 about the axis of the master arm 51 produces rotation of the grasper 54 about the slave arm 52. This rotation is transmitted from the handle to the grasper through the inner tube 91 of the master arm, the take-up device 98 secured to the upper end of the inner tube 91, the cables 99 and 100, the take-up device 98 on the slave arm 51, and the inner tube 91 on the slave arm to which the take-up device 98 is connected. Fig. 31 shows how the cables 99 and 100 connect the take-up devices 98 and are guided over the pulleys 112 and 114. Each of the cables 99 and 100 is actually formed of two sections interconnected by an adjustable element **220*a*** through which slack in the cables can be removed.

When the handle 53 and grasper 54 are to move conjointly about the axes of the shafts 69 and 154 or about the axes of the take-up drums 82 and 83, such conjoint movements are assured by the interconnection of the handle and the grasper through the cables 84, 85, 86, and 87, the take-up drums 82 and 83, and bevel gears 71 and 75, as shown in Fig. 30. When the handle 53 is moved about the axis of the shaft 69, gear 71 thereon rotates the associated gears 75 and take-up drums 82 and 83 in opposite directions. Such opposed rotation is transmitted through appropriate longitudinal movements of the cables 84, 85, 86, and 87 to the take-up drums 82 and 83 and gears 75 on the slave arm 52, which cause the grasper 54 to move about the axis of the shaft 154. When the handle 53 is moved about the axis of the associated take-up drums 82 and 83 and gears 75, these drums and gears rotate in the same direction. The resultant longitudinal movements of the cables 84, 85, 86, and 87 produce rotation of the take-up drums 82 and 83 and gears 75 on the slave arm in the same direction, which rotation brings about angular movement of the grasper 54 about the axis of the associated take-up drums 82 and 83 and gears 75. Each of the cables 84, 85, 86, and 87 is formed of two sections interconnected by an adjustable element **220*b*,** through which slack in the cables can be removed.

Angular movement of the master arm 51 about its pivotal connection on the shafts 132 (Figs. 19 and 20) with the horizontal support 50 is transmitted through the link 55 to produce angular movement of the slave arm 52 about its pivotal connection on the shafts 203 (Figs. 25 and 26) with the horizontal support.

As shown in Figs. 1 and 27, the horizontal support 50 is mounted in the channel 57 for rotation about its own axis on rollers **220*c*, engaging grooves 220*d* in the support 50 and journaled on brackets 220*e* secured to the channel 57. Thus angular movement of the master arm 51 about the axis of the support 50 produces angular movement of the support about the same axis, which angular movement produces a corresponding angular movement of the slave arm 52.**

Figures 35, 36:
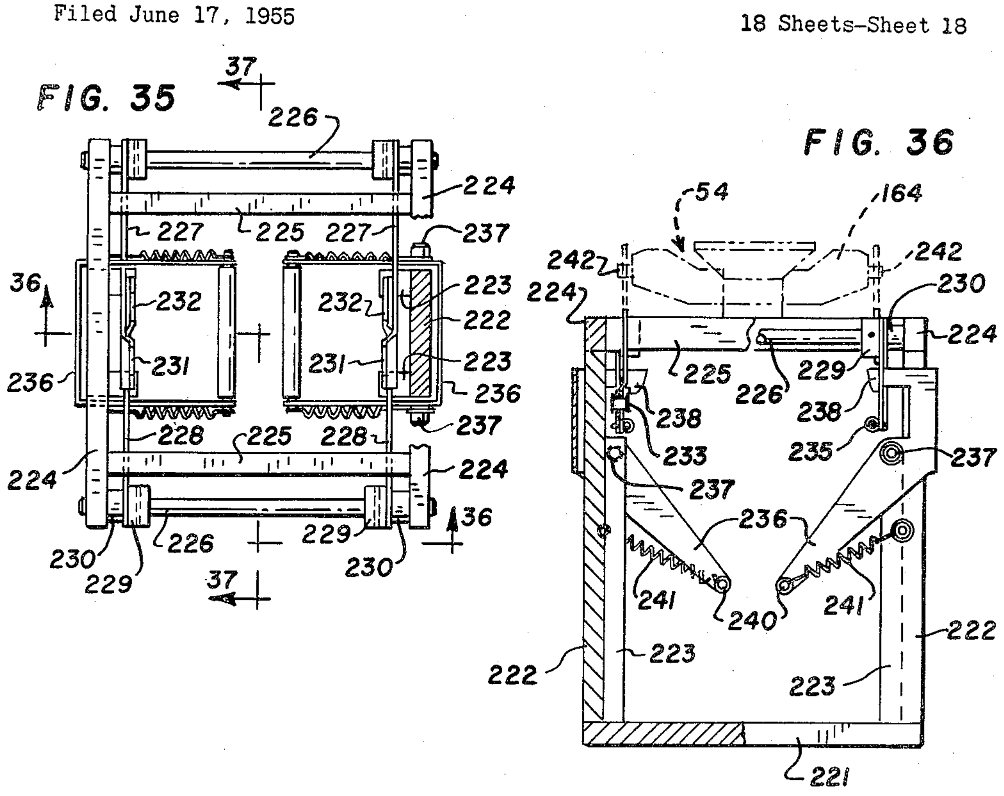
Fig. 35 is a plan view of a device for releasing the grasper from the slave arm.
Fig. 36 is a vertical sectional view taken on the line 36—36 of Fig. 35.
Figure 37:
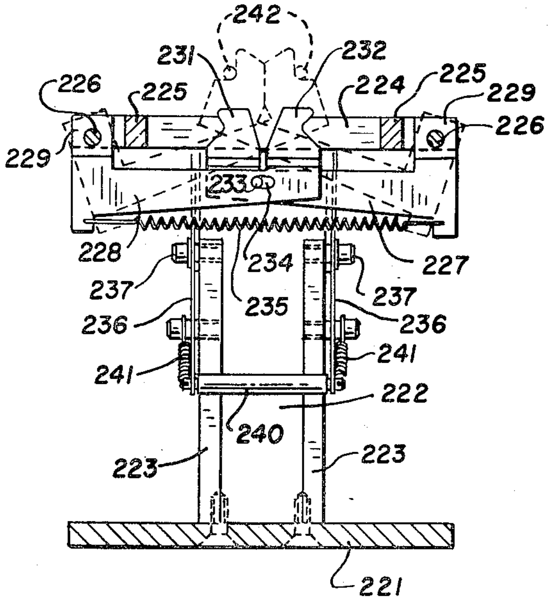
Fig. 37 is a vertical sectional view taken on the line 37—37 of Fig. 35.

The grasper 54 is removed from the lower end of the slave arm 52 by means of a device that is shown in detail in Figs. 35, 36, and 37. This device has a base 221 and a pair of opposed based uprights 222 secured to opposite sides of the base. Each upright has a pair of side flanges 223 which extend from the base 221 to a region somewhat spaced from the top of the upright. A horizontal extension piece 224 is secured to the top of each upright 222 so as to project laterally beyond both sides thereof. Members 225 are secured to and between the extension pieces 224 so as to brace them and the uprights 222. Shafts 226 are mounted in and extend between the ends of the extension pieces 224. The shafts 226 carry spreading elements 227 and 228, which are secured thereto by collars 229. The spreading elements 227 and 228 lie between the extension pieces 224 and are spaced therefrom by washers 230 mounted upon the shafts 226. Each spreading element 227 has at its end remote from the end secured to the shaft 226 an ear 231 which is transversely displaced from the plane of the balance of the spreading element 227 by an amount equal to approximately twice the thickness of the spreading element. Each spreading element 228 carries a corresponding ear 232 which is displaced from the plane of the balance of the spreading element by an amount approximately equal to the thickness of the spreading element. Thus each spreading element 227 has overlapping engagement with one spreading element 228 so that the ears 231 and 232 are aligned to abut one another in the raised position shown in dotted lines in Fig. 37. Each element 227 and the associated element 228 are tied to one another by means of a rivet 233 which extends through a short slot 234 in the element 228 and through an opening in the element 227. The spreading elements 227 and 228 of each pair are interconnected by a tension spring 235.

The device also has two U-shaped latches 236, one on each upright 222. Each latch 236 is pivotally mounted on the flanges 223 of the upright on headed pins 237 which have threaded engagement with the flanges. Each latch 236 has two hooks 238, formed on the legs at one end, and a rod 240, extending between and through the legs of the latch at the other end. Springs 241 are connected to the end of the rod 240 and the upright 222.

The spreading pieces 227 and 228 will normally tend to occupy the raised dotted-line position illustrated in Fig. 37 because of the action of the tension springs 235. In this event, the latches 236 at the right and the left in Fig. 36 will be displaced respectively clockwise and counterclockwise from the position shown, because raising of the elements 227 and 228 to the dotted-line position of Fig. 37 will prevent the hooks 238 from extending over the spreading elements 227 and 228 as shown in Fig. 36.

When the grasper 54 is to be removed from the slave arm 52, the manipulator is operated so as to move the grasper downwardly into the device of Figs. 35, 36, and 37, so that the side pieces 164 are directly over the device as shown in dash-dot lines in Fig. 36. In this position projections 242, which are formed on the ends of the side pieces 164 of the grasper engage the ears 231 and 232 of the spreading elements 227 and 228, as shown in Figs. 36 and 37. Continued downward movement of the grasper 54 into the device causes the spreading elements 227 and 228 to pivot from the dotted-line position of Fig. 37 to the full-line position. As a result of this movement, the ears 231 and 232 move apart and spread the projections 242 and the side pieces 164 of the grasper 54 to which they are joined. Thus the side pieces 164 of the grasper 54 are caused to release their hold upon carrier 155 or upon the boot 55*a* if it has been applied to the slave arm 52, and the flange pieces 180 attached to the side pieces 164 are moved outwardly sufficiently for the carrier 155 attached to the lower end of the slave arm 52 to be disengaged from the grasper 54. Once the spreading elements 227 and 228 have been depressed to the full-line position of Fig. 37, they will be held in this position by the latches 236, because by this time the hooks 238 of the latches will have moved over the top of the spreading elements 227 and 228 as shown in Fig. 36. Now the slave arm may be withdrawn from the device, leaving the grasper 54 firmly mounted in the device.

When the grasper 54 is to be reattached to the slave arm, or a new and uncontaminated grasper is to be attached thereto which will be firmly mounted in a device similar to the one shown in Figs. 35, 36, and 37, the slave arm 52 will be lowered into the device so that the fingers 157 (Fig. 9) engage the tie pieces 170 of the grasper (Fig. 8) and the rods 240 of the device lie between the jaws 165 of the grasper. Now by suitable actuation of the handle 53 involving movement of the finger hold 62 and thumb hold 63 toward one another, the fingers 157 will be caused to move the links 168 toward one another, bringing the jaws 165 toward one another, which in turn bring the rods 240 toward one another. At the same time the slave arm will act through the projections 242 on the side pieces 164 of the grasper 54 to depress the spreading elements 227 and 228 below the full-line position of Fig. 37. When the spreading elements 227 and 228 are thus depressed, the hooks 238 on the latches are released from the spreading elements 227 and 228 and move outwardly from the spreading elements, because the rods 240 on the latches are being shifted toward one another by the jaws 165. Now as the slave arm 52 is upwardly withdrawn from the device, the spreading elements 227 and 228 by being urged upwardly through the action of the spring 235 cause the grasper to follow the slave arm and to reengage the slave arm as the projections 242 on the side pieces 164 of the grasper 54 move together with upward movement of the spreading elements 227 and 228.

It will be appreciated that the detachment of the contaminated or dirty grasper 54 may be carried out entirely through actuation of the handle 53 which is in a safe area, and thus there is no danger to the operator. It is also possible to attach and detach the grasper by means of the device just described if the operator moves the slave arm 52 directly rather than indirectly through the master arm 51. The device functions equally well in the attachment and detachment of the grasper, whether or not the protective boot 55*a* is used between the grasper and the slave arm.

When the manipulator of the present invention is to be transported to a new location, handling can be facilitated by moving the arms to their lowermost position so as to bring the link 55 adjacent the support 50, and by moving the counterweight guides 133 down to the level of the master arm 51. The counterweight guides 133 can be moved as aforesaid after the brackets 134 and 136 have been unclamped from the counterweight guides by loosening of the screws 135 and 139. Now the manipulator has a relatively simple U-shape, the base of the U being formed of the support 50 and the link which are now close together, and the legs of the U being formed of the master and slave arms and the counterweight guides, all extending to one side of the base of the U. The U-shape of the manipulator enables it to be moved about in a limited space with greater ease.

The intention is to limit the invention only within the scope of the appended claims.

What is claimed is:

1. A remote-control manipulator comprising a horizontal support having mounting means at its ends, vertically adjustable master and slave arms positioned in the mounting means, a protective boot enclosing the lower end of the slave arm, a detachable grasper connected to the lower end of the slave arm outside of the boot, a horizontal link interconnecting the upper ends of the arms so as to be movable toward and away from the support as a result of vertical adjustment of the arms, a pair of vertical tubes mounted on the support on opposite sides of the master arm, and counterweights for the master and slave arms slidably mounted in the tubes and being connected to the master arm.

2. A remote-control manipulator comprising a slave arm, a carrier pivoted at one end of the slave arm for angular movement with respect thereto about three axes, a pair of fingers pivotally mounted on the carrier, a protective boot enclosing the fingers, the carrier, and said one end of the slave arm, the boot extending along the slave arm for some distance so as to terminate in an open end spaced from said one end of the slave arm, a pair of side pieces spring-urged toward one another so as to engage the carrier by contact with the exterior of the boot, a pair of links engaging the fingers by contact with the exterior of the boot, means pivotally connecting the links at one end to the side pieces, a pair of cooperating jaws connected with the links at the other end, and means extending through the slave arm and the support for changing the spacing between the fingers, whereby the fingers act through the links to change the spacing of the jaws, and means journaling the open end of the boot on the slave arm for angular movement of the boot about the slave arm as an axis, whereby the boot may move angularly about the slave arm during angular movement of the carrier.

3. The manipulator specified in claim 2 and further comprising a tubular section, and means mounting the slave arm in the tubular section for axial movement with respect thereto, the boot being of expansible and contractible construction to accommodate said axial movement of the slave arm.

4. A manipulator comprising an arm, a pair of fingers, means mounting the fingers on one end of the arm for angular movement toward and away from one another and for conjoint angular movement with respect to the arm, a protective boot enclosing the fingers and the said one end of the arm, a pair of cooperating clamping jaws exterior to the boot, and means mounting the jaws on the exterior of the boot and engaging the fingers by contact with the boot for enabling the jaws to be moved toward and away from one another in response to movement of the fingers toward and away from one another and to move angularly with the fingers during their conjoint angular movement with respect to the arm.

5. The manipulator specified in claim 4 and further comprising means journaling the open end of the boot on the arm to enable the boot to move angularly about the arm during the conjoint angular movement of the fingers with respect to the arm.

6. The manipulator specified in claim 4 and further comprising a tubular section, means mounting the arm in the tubular section for axial movement with respect thereto, and means journaling the open end of the boot on the tubular section for angular movement with respect thereto, the boot having a plurality of corrugated expanso-contractible sections of different sizes designed to accommodate axial movement of the arm with respect to the tubular section.

7. A remote-control manipulator comprising spaced generally parallel master and slave arms, a support extending between the arms, means mounting the arms on the support for longitudinal movement axial of the arms with respect to the support and for angular movement with respect to the support about axes at the support, a handle and a grasper connected with the lower ends of the master arm and the slave arm, respectively, a link interconnecting the upper ends of the arms to transmit angular movement from the master arm to the slave arm, the link moving toward or away from the support during axial movements of the arms, a first tie means extending from the upper end of the master arm, along the same to the support, along the support to the slave arm, and along the same to the lower end thereof, and a second tie means extending from the upper end of the slave arm, along the same to the support, along the support to the master arm, and along the same to the lower end thereof.

8. The manipulator specified in claim 7, the arms being angularly movable about their own axes, the manipulator further comprising means interconnecting the upper ends of the arms for causing angular movement of the master arm about its own axis to produce angular movement of the slave arm about its own axis.

9. The manipulator specified in claim 8, and further comprising means extending from the handle along the master arm, from the upper end thereof to the upper end of the slave arm, and along the slave arm to the grasper so as to interconnect the handle and the grasper for enabling opening and closing of the handle to bring about opening and closing of the grasper.

10. The manipulator specified in claim 9 and further comprising means interconnecting the handle and the grasper and extending along the arms and between the upper ends of the arms so as to enable angular movements of the handle with respect to the master arm to produce angular movements of the grasper with respect to the slave arm.

11. A remote-control manipulator comprising spaced generally parallel master and slave arms, a handle and a grasper connected with the lower ends of the master arm and the slave arm, respectively, a support extending between the arms, means mounting the slave arm on the support for longitudinal movement axial of the arm and for angular movement with respect to the support, a pair of posts attached to the support at the master arm so as to move with the support during movement of the same about its own axis and to move angularly with respect to the support about an axis transverse to the axis thereof, a tubular section fixed to the posts and mounting the master arm for movement axial thereof, a bracket secured to the posts in engagement with the tubular section, counterweight guides secured to the bracket on opposite sides of the tubular section and extending upwardly from the bracket, counterweights for the master and slave arms movable along the guides, flexible tie means connecting the counterweights and an upper portion of the master arm and being trained over the upper ends of the guides so as to cause the counterweights to move up and down as the master arm moves down and up, a first tie means extending from the upper end of the master arm, along the same to the support, along the support to the slave arm, and along the same to the lower end thereof, and a second tie means extending from the upper end of the slave arm, along the same to the support, along the support to the master arm, and along the same to the lower end thereof.

References Cited in the file of this patent

UNITED STATES PATENTS 2,632,574 Goertz ---------------- Mar. 24, 1953

FOREIGN PATENTS 641,046 Germany -------------- Jan. 18, 1937